US011212112B2

(12) United States Patent
Sako et al.

(10) Patent No.: US 11,212,112 B2
(45) Date of Patent: Dec. 28, 2021

(54) SYSTEM, DATA MANAGEMENT METHOD, AND PROGRAM

(71) Applicant: NEC Corporation, Tokyo (JP)

(72) Inventors: Kazue Sako, Tokyo (JP); Isamu Teranishi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 317 days.

(21) Appl. No.: 16/320,621

(22) PCT Filed: Jul. 28, 2017

(86) PCT No.: PCT/JP2017/027461
§ 371 (c)(1),
(2) Date: Jan. 25, 2019

(87) PCT Pub. No.: WO2018/021535
PCT Pub. Date: Feb. 1, 2018

(65) Prior Publication Data
US 2019/0165948 A1 May 30, 2019

(30) Foreign Application Priority Data

Jul. 29, 2016 (JP) .............................. JP2016-150100

(51) Int. Cl.
H04L 9/32 (2006.01)
H04L 9/30 (2006.01)
(Continued)

(52) U.S. Cl.
CPC ............ H04L 9/3255 (2013.01); G06Q 50/30 (2013.01); G09C 1/00 (2013.01); H04L 9/30 (2013.01);
(Continued)

(58) Field of Classification Search
None
See application file for complete search history.

(56) References Cited

U.S. PATENT DOCUMENTS 7,818,256 B1 * 10/2010 Ward .................... H04L 9/3247
705/51
8,041,944 B2 10/2011 Teranishi
(Continued)

FOREIGN PATENT DOCUMENTS

JP 2002-215026 A 7/2002
JP 2007-4461 A 1/2007
(Continued)

OTHER PUBLICATIONS

Camenisch, et al., "Group Signatures: Better Efficiency and New Theoretical Aspects", 2004, vol. 3352 of LNCS, pp. 120-133 (14 pages total).
(Continued)

Primary Examiner — Michael Pyzocha
(74) Attorney, Agent, or Firm — Sughrue Mion, PLLC

(57) ABSTRACT

A system includes a plurality of nodes, an individual one of which transmits data to which a group signature is attached, and a plurality of management servers that are directly connected to each other. An individual one of the plurality of management servers includes a ledger for managing data received from the nodes. Addition of data to the ledger of at least one of the plurality of management servers is reflected on the ledgers of the other management servers.

3 Claims, 20 Drawing Sheets

(51) Int. Cl.
*G09C 1/00* (2006.01)
*G06Q 50/30* (2012.01)

(52) U.S. Cl.
CPC .......... *H04L 9/3239* (2013.01); *H04L 9/3263* (2013.01); *H04L 9/3268* (2013.01); *H04L 9/3271* (2013.01); H04L 2209/38 (2013.01); H04L 2209/84 (2013.01)

(56) References Cited

U.S. PATENT DOCUMENTS

| | | | |
|---|---|---|---|
| 2006/0294103 A1* | 12/2006 | Wood | H04L 41/046 |
| 2009/0089575 A1 | 4/2009 | Yonezawa et al. | |
| 2009/0276630 A1 | 11/2009 | Teranishi | |
| 2010/0275015 A1* | 10/2010 | Zhang | H04L 63/0823 713/158 |
| 2012/0072732 A1* | 3/2012 | Canard | H04L 9/3247 713/176 |
| 2016/0379212 A1* | 12/2016 | Bowman | H04L 9/3239 705/71 |
| 2017/0180134 A1* | 6/2017 | King | H04L 63/0823 |
| 2017/0237570 A1* | 8/2017 | Vandervort | G16H 10/60 713/176 |
| 2017/0278186 A1* | 9/2017 | Creighton, IV | G06Q 20/401 |
| 2017/0344983 A1* | 11/2017 | Muftic | G06Q 20/407 |
| 2017/0352027 A1* | 12/2017 | Zhang | G06Q 20/3678 |
| 2018/0006826 A1* | 1/2018 | Smith | H04L 9/30 |
| 2018/0006829 A1* | 1/2018 | Kravitz | H04W 12/06 |
| 2018/0204192 A1* | 7/2018 | Whaley | G06Q 20/0658 |
| 2018/0262493 A1* | 9/2018 | Andrade | G06F 21/30 |
| 2018/0343128 A1* | 11/2018 | Uhr | H04L 9/3265 |

FOREIGN PATENT DOCUMENTS

| | | |
|---|---|---|
| JP | 2011-24011 A | 2/2011 |
| JP | 5099003 B2 | 12/2012 |
| WO | 2006/137250 A1 | 12/2006 |

OTHER PUBLICATIONS

Sako, et al., "Anonymous Authentication Scheme for Pursuit of Security and Privacy", Journal of Information Processing Society of Japan, 2006, vol. 47, No. 4, pp. 410-416 (7 pages total).
Fuchita, "Block Chain to Kin'yu Torihiki no Kakushin", Nomura Capital Markets Quarterly, Nov. 1, 2015, vol. 19, No. 2, pp. 11-35 (29 pages total).
International Search Report, issued by International Searching Authority in corresponding International Application No. PCT/JP2017/027461, dated Oct. 24, 2017.
Written Opinion issued by the International Bureau in corresponding International Application No. PCT/JP2017/027461, dated Oct. 24, 2017.

* cited by examiner

FIG. 8

OPERATION MANAGEMENT DATA

| PICK-UP LOCATION | DROP-OFF LOCATION | CURRENT LOCATION | NOTIFICATION DESTINATION |
|---|---|---|---|
| LOCATION X | LOCATION Y1 | LOCATION Y2 | xxx@yyy.zzz |

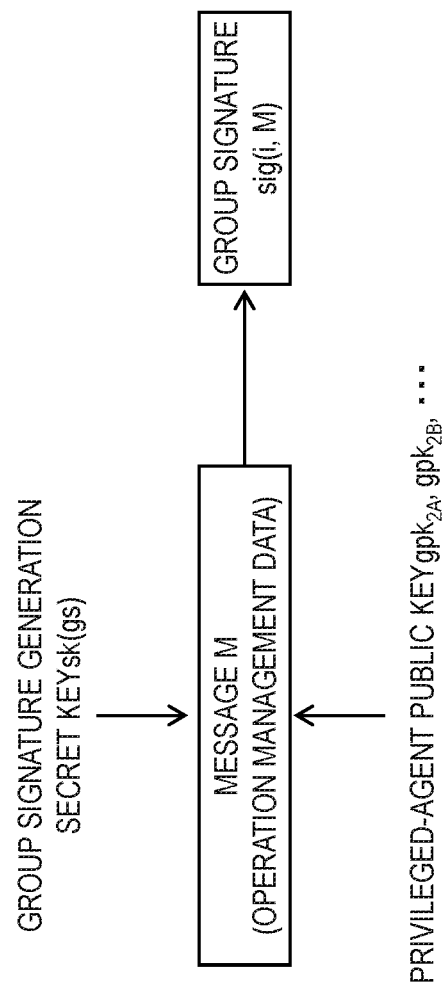

SYSTEM, DATA MANAGEMENT METHOD, AND PROGRAM

TECHNICAL FIELD

Reference to Related Application

The present invention is based upon and claims the benefit of the priority of Japanese patent application No. 2016-150100, filed on Jul. 29, 2016, the disclosure of which is incorporated herein in its entirety by reference thereto.

The present invention relates to a system, a data management method, and a program. In particular, it relates to: a system including a plurality of nodes, each of which transmits data; a data management method; and a program.

BACKGROUND

Improvement in network technology and information processing technology has created cases where a plurality of companies having a competitive relationship coordinate with each other and provide highly convenient services. As an example of these services, there is a taxi dispatch system using terminals such as smartphones. A plurality of taxi companies participate in the taxi dispatch system, and the taxis of these taxi companies transmit data (operation management data) including their own current locations, etc. to a management system (a dispatch server) by using their dedicated taximeters, etc.

The management system grasps the current locations of the individual taxis based on their respective operation management data. In addition, the individual taxi companies access and use the operation management data to grasp the operational statuses and the like of their own taxis. In the above system configuration, when a customer requests dispatch of a taxi by operating his/her own terminal, the management system selects a taxi close to the customer within the service providing area and instructs the taxi to pick up the customer.

In the above taxi dispatch system, use of taximeters connected to smartphones or the like is assumed, and exchange of operation management data via an existing mobile line or the like is expected. In this operation, the validity of an individual entity that transmits operation management data needs to be assured (namely, authentication of an individual taxi). Regarding the assurance of the validity, a digital signature can be used.

Patent Literature 1 discloses a service providing system in which an outsourcer entrusts a service(s) for members to an outsourcing contractor without releasing membership information to the outsourcing contractor. Patent Literature 1 discloses whether a user apparatus is a member of an outsource apparatus is verified only with public information of the outsource apparatus by using a group signature scheme.

Patent Literature 2 discusses providing a group signature system and an information processing method which enable reduction of the calculation amount of information processing performed when a user apparatus is registered to or withdrawn from a group.

Non-Patent Literature 1 discloses a group signature scheme referred to as the Camenisch-Groth scheme. In Non-Patent Literature 2, an outline of the Camenisch-Groth scheme disclosed in Non-Patent Literature 1 is described.

Patent Literature 1

Japanese Patent Kokai Publication No. JP2007-004461A

Patent Literature 2

Japanese Patent No. JP5099003

Non Patent Literature

Non-Patent Literature 1: Jan Camenisch. Jens Groth. Group Signatures, "Better Efficiency and New Theoretical Aspects" SCN 2004, vol. 3352 of LNCS, pp. 120-133, 2004

Non-Patent Literature 2: Kazue Sako, Shoko Yonezawa, Jun Furukawa, "Anonymous Authentication Scheme for Pursuit of Security and Privacy", Journal of Information Processing Society of Japan, Vol. 47, No. 4, pp. 410-416, 2006.4

SUMMARY

The disclosure of each of the Patent Literatures 1 and 2 and the Non-Patent Literatures 1 and 2 included in the above citation list is incorporated herein by reference thereto. The following analysis has been made by the present inventors.

As described above, regarding assurance of the validity of an entity that transmits operation management data, when a taximeter transmits operation management data, a digital signature based on a public key infrastructure (PKI) can be attached to the operation management data. The management system can check the validity of an individual taxi by verifying the corresponding digital signature. Namely, the management system that receives operation management data verifies the validity of the corresponding taxi by verifying the digital signature attached to the operation management data.

However, use of digital signatures could have a problem in that information about the taxis of one company is released to other companies. To verify a digital signature attached by a taxi (taximeter), a public key of this taxi is needed. In addition, since whether the owner of the public key (the taxi) is a taxi that is eligible to participate in the taxi dispatch system needs to be checked, for example, at least information about a company to which the taxi belongs needs to be included in the electronic certificate (public key certificate) of the public key.

A single public key indicates a single owner, namely, a single taxi. Thus, if a company to which taxis belong is determined from public key certificates, the number of taxis that belong to the company or past operational records could be determined. For example, by extracting operation management data determined to belong to a company A from a plurality of operation management data to which digital signatures have been attached and by counting the public keys applied to the extracted operation management data, the number of taxis of the company A participating in the taxi dispatch system is determined. Thus, while a digital signature is used for assurance of the validity of operation management data, use of the operation management data and public key certificate could allow a company(ies) to grasp the number of taxis owned by a competitor(s), for example. The taxi companies participating in the taxi dispatch system originally have a competitive relationship, and therefore, it is not desirable that the information as described above about a company(ies) be released to the other companies. In a case where a plurality of companies or firms having a competitive relationship provide services in coordination with each other, verification of the validity of acquired data and limitation on information that can be grasped are demanded.

It is an object of the present invention to provide a system, a data management method, and a program that enable verification of the validity of data and appropriately limit information obtainable from the data.

According to a first aspect of the present invention, there is provided a system, including: a plurality of nodes, an individual one of which transmits data to which a group signature is attached; and a plurality of management servers that are directly connected to each other; wherein an individual one of the plurality of management servers includes a ledger for managing data received from the nodes; and wherein addition of data to the ledger of at least one of the plurality of management servers is reflected on the ledgers of the other management servers.

According to a second aspect of the present invention, there is provided a system, including: a plurality of nodes, an individual one of which belongs to a group; a plurality of node management servers, an individual one of which manages a node(s) that belongs to a corresponding one of the groups; and a certificate management server that issues a member certificate to an individual one of the plurality of nodes, the member certificate being used when the individual one of the plurality of nodes generates a group signature, and releases a management-agent public key; wherein an individual one of the plurality of node management servers releases a privileged-agent public key; and wherein an individual one of the nodes generates a group signature to be attached to data, by using at least the management-agent public key and the privileged-agent public keys released by the respective node management servers.

According to a third aspect of the present invention, where is provided a data management method in a system including a plurality of nodes and a plurality of management servers that are directly connected to each other and that include ledgers for managing data received from the nodes, the data management method, including: causing at least one of the nodes to transmit data to which a group signature has been attached; causing at least one of the management servers to receive the data to which the group signature has been attached; causing the at least one of the management servers to add the received data to the corresponding ledger; and causing the other management servers to reflect addition of the data to the ledger by the at least one of the plurality of management servers on the corresponding ledgers.

According to a fourth aspect of the present invention, there is provided a program, executed by a computer mounted on a management server that is directly connected to other management servers and that includes a ledger for managing data received from a node(s), the program causing the computer to perform processing for: receiving data, which is transmitted by the node(s) and to which a group signature(s) has been attached; adding the received data to the ledger; and reflecting addition of data to the ledger by at least one of the other management servers on the ledger of the management server.

This program can be stored in a computer-readable storage medium. The storage medium may be a non-transient storage medium such as a semiconductor memory, a hard disk, a magnetic storage medium, or an optical storage medium. The present invention can be embodied as a computer program product.

According to aspects of the present invention, there are provided a system, a data management method, and a program that enable verification of the validity of data and contribute to appropriate limitation on information obtainable from the data.

BRIEF DESCRIPTION OF THE DRAWINGS

FIG. 8 illustrates an example of operation management data.
FIG. 20 illustrates generation of a group signature according to the second exemplary embodiment.

PREFERRED MODES

Figure 1:
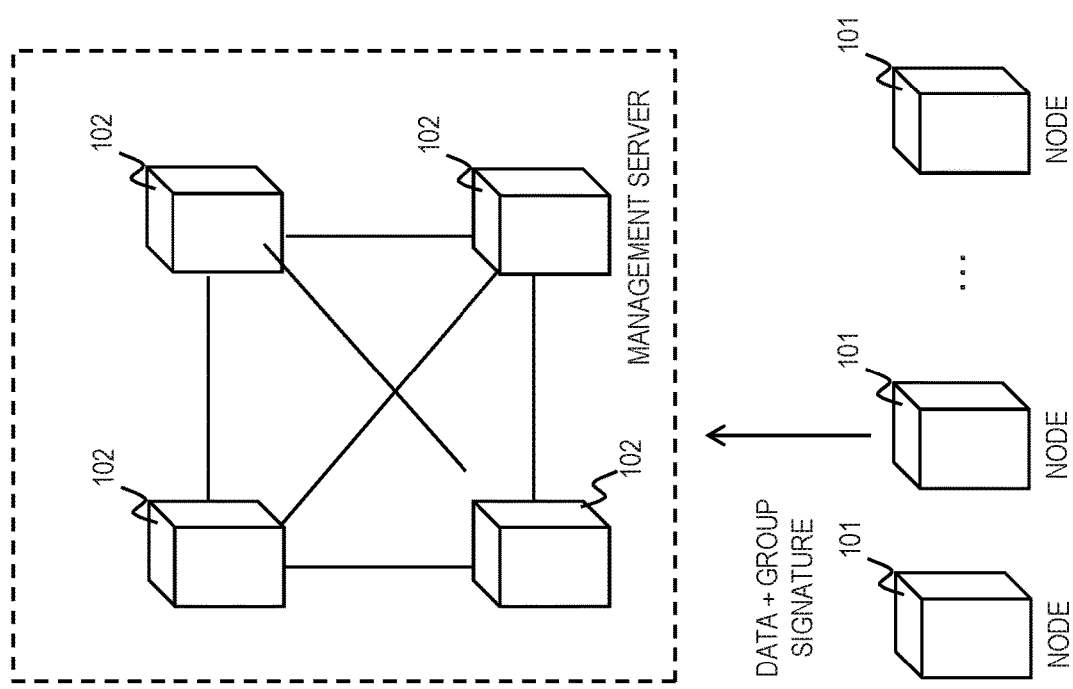
FIG. 1 illustrates an outline of an exemplary embodiment.

First, an outline of an exemplary embodiment will be described. In the following outline, various elements are denoted by reference characters for the sake of convenience. Namely, the following reference characters are merely used as examples to facilitate understanding of the present invention, and the description of the outline is not intended to impose any limitations.

A system according to an exemplary embodiment includes a plurality of nodes 101, an individual one of which transmits data to which a group signature has been attached, a plurality of management servers 102 that are directly connected to each other (see FIG. 1). An individual one of the plurality of management servers 102 includes a ledger for managing data received from the nodes 101. Addition of data to the ledger of at least one of the plurality of management servers 102 is reflected on the ledgers of the other management servers 102.

In the system according to the above exemplary embodiment, the validity of an entity that has generated data can be verified by a group signature attached to the data. In addition, information obtained from the group signature is only about the group (firm, organization) to which the entity that has generated the group signature belongs, and the entity that has generated the group signature cannot uniquely be determined. Thus, information obtained from data and the corresponding signature is appropriately limited.

Hereinafter, specific exemplary embodiments will be described in more detail with reference to drawings. In the individual exemplary embodiments, like constituent elements will be denoted by like reference characters, and description thereof will be omitted.

First Exemplary Embodiment

A system according to a first exemplary embodiment will be described in more detail with reference to drawings. In the first exemplary embodiment, a taxi dispatch system will be described as an example. However, the present application disclosed herein is not only applicable to the taxi dispatch system but also to other systems. The present application is applicable to any system in which the validity of data to be managed can be verified and appropriate limitation on information obtainable from the data is needed.

For example, other than a system relating to a dispatch of a taxis, the above requirements match a taxi fare prediction system, a taxi fare determination system, a required-time prediction system, etc. that utilize drive data that can be extracted from taximeters.

Another system to which the present application is applicable is a charging system for electric vehicles provided by a plurality of automobile manufacturers. In this charging system, while the qualification of an individual vehicle that wishes to use the charging system needs to be verified (whether an individual vehicle is a vehicle manufactured by an automobile manufacturer participating in the charging system), there is no need to determine the individual vehicle that has actually used the charging system. Thus, this system matches the above requirements.

[Outline of System Configuration]

Figure 2:
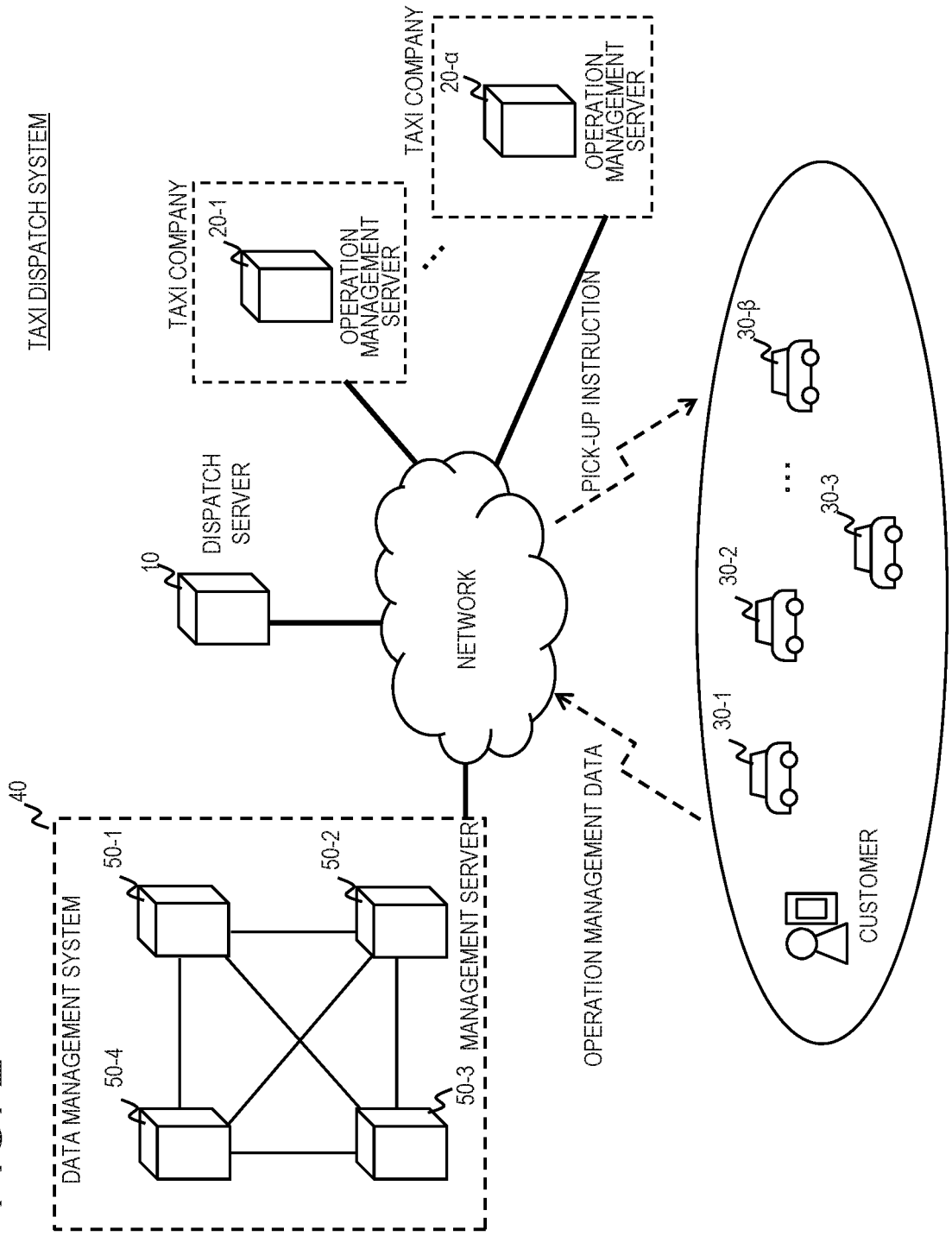
FIG. 2 illustrates an example of a system configuration of a taxi dispatch system according to a first exemplary embodiment.

FIG. 2 illustrates an example of a system configuration of the taxi dispatch system according to the first exemplary embodiment. As illustrated in FIG. 2, the taxi dispatch system includes a dispatch server 10, operation management servers 20-1 to 20-α (α is a positive integer, and the same holds true for the following), taxis 30-1 to 30-β (β is a positive integer, and the same holds true for the following) that belong to taxi companies, and a data management system 40. In the following description, unless the operation management servers 20-1 to 20-a need to be distinguished from each other for some particular reason, each of the operation management servers will simply be referred to as an "operation management server 20". Likewise, unless the taxis 30-1 to 30-0 need to be distinguished from each other for some particular reason, each of the taxis will simply be referred to as a "taxi 30".

The dispatch server 10, the operation management servers 20, and the data management system 40 are connected to each other via a network such as the Internet. The taxis 30 can be connected to the network by using a mobile line or the like.

The dispatch server 10 is a server installed by a taxi association or the like. The dispatch server 10 is an apparatus that realizes main functions of the taxi dispatch system. Specifically, the dispatch server 10 refers to operation management data managed by the data management system 40 and selects a taxi 30 that is close to a customer (more specifically, a terminal used by a customer) that has made a dispatch request. Next, the dispatch server 10 instructs the selected taxi 30 to pick up the customer by specifying the location of the customer.

In the taxi dispatch system in which a plurality of taxi companies participate, an individual one of the operation management servers 20 is an apparatus for managing the taxis 30 held by the corresponding company. Assuming that the taxis 30 are nodes included in the system, an individual one of the operation management servers 20 corresponds to a "node management server". Each operation management server 20 performs procedures and preparations necessary for the taxis 30 of the corresponding company to participate in the taxi dispatch system (to become members of the system). Specifically, for example, an individual operation management server 20 generates information necessary for group signatures. For example, a taxi 30 of a company attaches a group signature to operation management data before transmitting the operation management data to the data management system. An individual operation management server 20 also has a function of managing operational status of the taxis of the corresponding company by referring to the operation management data stored in an electronic bulletin board provided by the data management system 40.

The taxis 30 correspond to the above nodes 101. An individual taxi 30 belongs to one of the plurality of taxi companies (groups) participating in the taxi dispatch system.

An individual taxi 30 includes a taximeter that uses a terminal such as a smartphone. An individual taximeter generates operation management data and transmits the generated data to the data management system 40. Before transmitting the operation management data to the data management system 40, the taximeter attaches a group signature to the operation management data. In addition, when the taximeter acquires a pick-up instruction directed thereto from the dispatch server 10, the taximeter displays the pick-up instruction on a display and notifies the corresponding driver of the pick-up instruction.

The data management system 40 is a system operated by an organization or the like independent of the taxi association and the taxi companies. The data management system 40 is a system that provides an electronic bulletin board on which outsiders (third parties) can add and read data. The data management system 40 uses so-called blockchain technology to manage various kinds of information such as operation management data.

The data management system 40 provides an electronic bulletin board on which any agent can add information and read written information by paying a predetermined fee. Once information is written on this electronic bulletin board, the information cannot be deleted or falsified. More accurately, the data management system 40 is a system that provides an interface relating to data input/output, and external apparatuses can handle the interface like an electronic bulletin board.

In the taxi dispatch system illustrated in FIG. 2, information (namely, operation management data) necessary for a dispatch of a taxi is exchanged via the electronic bulletin board provided by the data management system 40. As described above, since the data management system 40 is a system that provides the electronic bulletin board to third parties, data unrelated to the above operation management data (for example, product sales data or the like unrelated to a dispatch of a taxi) is also written on the electronic bulletin board.

The data management system 40 includes a plurality of management servers 50-1 to 50-4. While four management servers are illustrated in FIG. 2, the number of management servers included in the data management system 40 is not limited to 4. However, the data management system 40 needs to include at least two management servers. In addition, as is the case with the operation management servers 20, etc., unless the management servers 50-1 to 50-4 need to be distinguished from each other for some particular reason, each of the management servers will be referred to as a "management server 50".

The plurality of management servers 50 included in the data management system 40 are directly connected to each other, as illustrated in FIG. 2. Namely, the plurality of management servers 50 included in the data management system 40 are connected to each other based on a peer-to-peer (P2P) architecture.

In the data management system 40, an individual one of the management servers 50 connected to each other based on the P2P architecture includes a ledger (which will be referred to as a data management ledger) for managing data (operation management data, sales data, etc.) received from the outside. In the data management system 40, the data management ledgers are distributed to the respective management servers 50. The distributed data management ledgers are shared and managed by the management servers 50.

While the data management system 40 exchanges data with external nodes, the following description will be made with a focus only on data exchange among the data management system 40, the dispatch server 10, the operation management servers 20, and the taxis 30. However, in reality, since the data management system 40 provides a general-purpose electronic bulletin board to a wide range of third parties, data is exchanged among various nodes other than the dispatch server 10, etc.

[Hardware Configuration]

Figure 3:
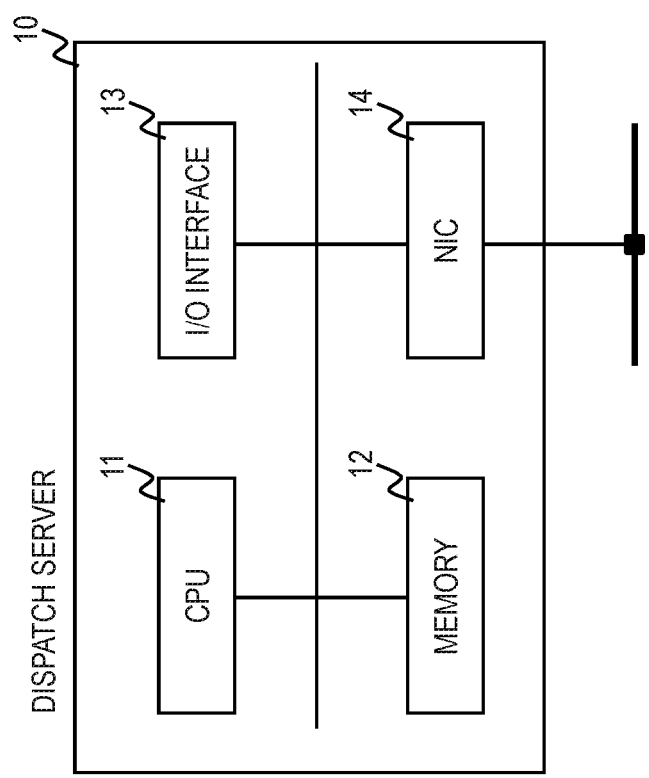
FIG. 3 is a block diagram illustrating an example of a hardware configuration of a dispatch server according to the first exemplary embodiment.

Next, hardware configurations of various kinds of apparatuses included in the taxi dispatch system according to the first exemplary embodiment will be described. FIG. 3 is a block diagram illustrating an example of a hardware configuration of the dispatch server 10 according to the first exemplary embodiment.

The dispatch server 10 can be configured by an information processing apparatus (a computer) and has a configuration illustrated in FIG. 3. For example, the dispatch server 10 includes a central processing unit (CPU) 11, a memory 12, an input-output interface 13, and a network interface card (NIC) 14, which is communication means. These elements are connected to each other via an internal bus.

The hardware configuration of the dispatch server 10 is not limited to the configuration illustrated in FIG. 3. The dispatch server 10 may include hardware not illustrated in FIG. 3. If the input-output interface 13 is not necessary, the dispatch server 10 may be configured without the input-output interface 13. In addition, the number of CPUs or the like included in the dispatch server 10 is not limited to the configuration illustrated in FIG. 3. For example, a plurality of CPUs may be included in the dispatch server 10.

The memory 12 is a random access memory (RAM), a read-only memory (ROM), or an auxiliary storage device (a hard disk or the like).

The input-output interface 13 is means serving as an interface for a display apparatus and an input apparatus not illustrated. The display apparatus is, for example, a liquid crystal display or the like. The input apparatus is, for example, an apparatus that receives user operations, such as a keyboard or a mouse.

Functions of the dispatch server 10 are realized by various kinds of processing modules described below. For example, an individual one of the processing modules is realized by causing the CPU 11 to execute a program stored in the memory 12. The program can be downloaded via a network or updated by using a storage medium holding a program. In addition, an individual one of the above processing modules may be realized by a semiconductor chip. Namely, it is only necessary to have means of executing the functions of the above processing modules by using some hardware and/or software.

As is the case with the dispatch server 10, an individual one of the operation management servers 20 and the management servers 50 can also be configured by an information processing apparatus and has the same basic hardware configuration as that of the dispatch server 10. Thus, description of the basic hardware configuration of the servers 20 and 50 will be omitted.

Figure 4:
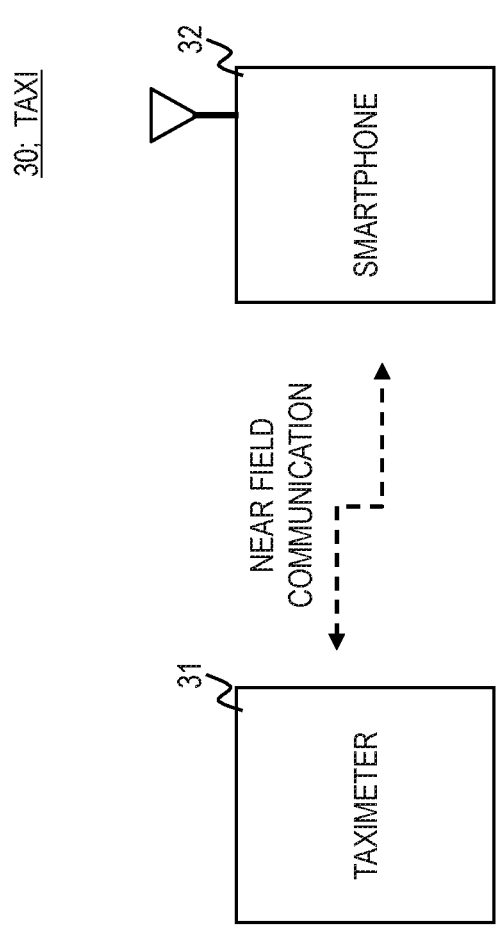
FIG. 4 illustrates an example of a schematic configuration of a taxi according to the first exemplary embodiment.

FIG. 4 illustrates an example of a schematic configuration of a taxi 30. As illustrated in FIG. 4, the taxi 30 includes a taximeter 31 that uses a smartphone 32. The taximeter 31 and the smartphone 32 can communicate with each other through near field communication such as Bluetooth (trademark) or through wired connection using a cable. By communicating with the smartphone 32, the taximeter 31 uses the corresponding hardware (for example, mobile line access means and a global positioning system (GPS) function).

While the taximeter 31 and the smartphone 32 are illustrated in FIG. 4, the illustration of the hardware that realizes the functions as the taxi (a vehicle) is omitted. In addition, since the taximeter 31 and the smartphone 32 can have substantially the same hardware as that of an information processing apparatus (a computer) and this hardware is apparent to those skilled in the art, description thereof will be omitted.

[Dispatch Server]

Next, details of the dispatch server 10 will be described.

Figure 5:
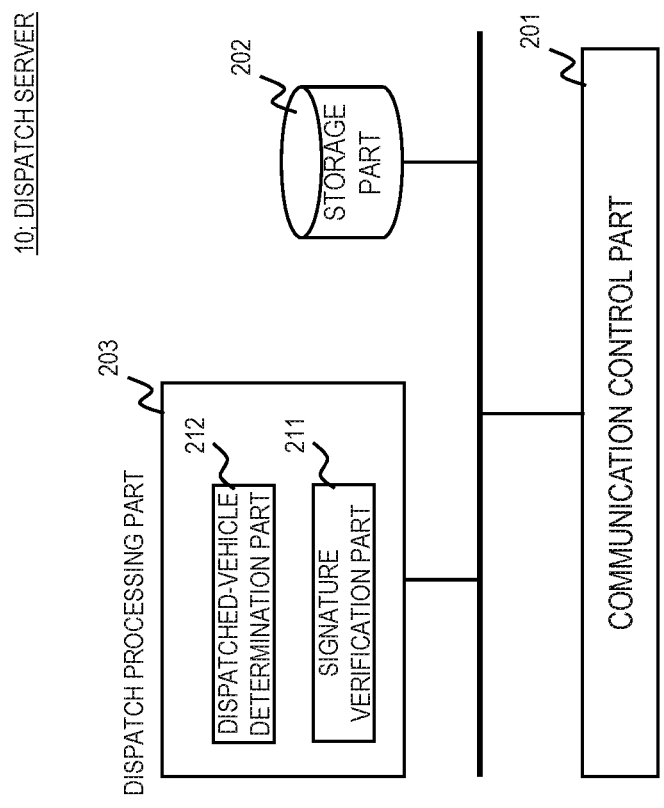
FIG. 5 is a block diagram illustrating an example of a processing configuration of the dispatch server according to the first exemplary embodiment.

FIG. 5 is a block diagram illustrating an example of a processing configuration of the dispatch server 10 according to the first exemplary embodiment. As illustrated in FIG. 5, the dispatch server 10 includes a communication control part 201, a storage part 202, and a dispatch processing part 203.

The communication control part 201 is means for realizing communication with other apparatuses. The communication control part 201 is also means for sorting messages (packets) received from other apparatuses to various processing module parts or transmitting messages acquired from various processing modules to other apparatuses.

For example, the storage part 202 holds data necessary for processing or the like performed by the dispatch processing part 203.

The dispatch processing part 203 is means for processing dispatch requests from customers. When the dispatch processing part 203 receives a dispatch request from a customer, the dispatch processing part 203 acquires operation management data from the data management system 40. For example, the dispatch processing part 203 transmits a request for reading operation management data in a predetermined period between a predetermined time in the past and the current time stored in the electronic bulletin board to the data management system 40 and acquires the read operation management data. Alternatively, the dispatch processing part 203 may specify a data amount to be acquired and transmit an operation management data read request to the data management system 40. Based on the acquired operation management data, the dispatch processing part 203 determines a taxi 30 to be dispatched to the customer and instructs the taxi 30 to pick up the customer.

The dispatch processing part 203 includes two submodules of a signature verification part 211 and a dispatched-vehicle determination part 212.

The signature verification part 211 is also means for verifying the group signatures attached to the operation management data acquired from the data management system 40. As will be described below, the operation management servers 20 of the taxi companies release their respective management-agent public keys and privileged-agent public keys. Thus, when verifying a group signature attached to operation management data, the signature verification part 211 uses the public keys (the management-agent public key and the privileged-agent public key) of the corresponding taxi company. The group signature can be verified in accordance with the "group signature verification algorithm" illustrated in FIG. 7 of Non-Patent Literature 2.

As a result of the verification, if the validity of the operation management data is confirmed, the signature verification part 211 hands over the data to the dispatched-vehicle determination part 212. As a result of the verification, if the validity of the operation management data cannot be confirmed, the signature verification part 211 discards the data. The signature verification part 211 performs the verification processing as described above on the acquired operation management data and hands over only the data whose validity has been confirmed to the dispatched-vehicle determination part 212.

The dispatched-vehicle determination part 212 is means for determining a taxi 30 to which a pick-up instruction is transmitted by using the operation management data whose validity has been confirmed. For example, the dispatched-vehicle determination part 212 compares the current location of the customer who has made the dispatch request with the current locations of the taxis 30 included in the operation management data and determines the operation management data including a current location closest to the customer. As will be described below, since each of the operation management data includes a message notification destination (for example, a mail address) of a corresponding taxi 30, the dispatched-vehicle determination part 212 transmits a pick-up instruction to the notification destination obtained from the determined operation management data. In this operation, the dispatched-vehicle determination part 212 adds the current location of the customer to the pick-up instruction.

[Operation Management Server]

Next, details of an operation management server 20 will be described.

An individual operation management server 20 according to the first exemplary embodiment has a function of issuing member certificates to its group members (taxis 30) and a function of determining a taxi 30 that has generated operation management data. Namely, an individual operation management server 20 according to the first exemplary embodiment has a role as a "management agent" and a role as a "privileged-agent" described in Non-Patent Literature 2.

Figure 6:
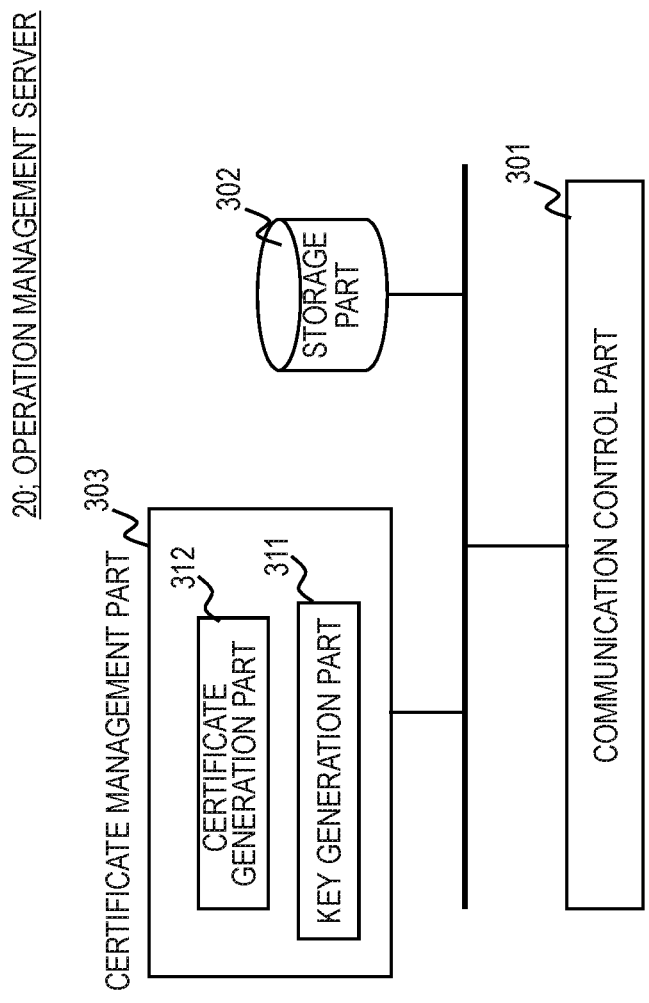
FIG. 6 is a block diagram illustrating an example of a processing configuration of an operation management server according to the first exemplary embodiment.

FIG. 6 is a block diagram illustrating an example of a processing configuration of an operation management server 20 according to the first exemplary embodiment. As illustrated in FIG. 6, the operation management server 20 includes a communication control part 301, a storage part 302, and a certificate management part 303. The illustration of a function module for determining the operational statuses of the taxis 30 that belong to the corresponding group is omitted in FIG. 6.

The communication control part 301 is means for realizing communication with other apparatuses. The communication control part 301 is also means for sorting messages (packets) received from other apparatuses to various processing module parts or transmitting messages acquired from various processing modules to other apparatuses.

The storage part 302 holds information necessary for generation of keys and member certificates by the certificate management part 303.

The certificate management part 303 is means for generating and managing information necessary for the taxis 30 of the corresponding company to generate group signatures attached to operation management data. The certificate management part 303 includes two submodules of a key generation part 311 and a certificate generation part 312.

The key generation part 311 generates a pair of management-agent public key and a management-agent secret key and a pair of a privileged-agent public key and a privileged-agent secret key used for a group signature. The key generation part 311 releases the management-agent public key and the privileged-agent public key. The released management-agent public key is acquired at least by the dispatch server 10. The privileged-agent public key is acquired at least by the taxis 30 of the corresponding company and the dispatch server 10.

The certificate generation part 312 is means for generating and issuing "member certificates" needed when the taxis 30 of the corresponding company generate group signatures. The certificate generation part 312 generates member certificates in coordination with a certificate acquisition part 403, which will be described below, of the taximeter 31 and distributes the generated member certificates to the taxis 30. Specifically, in accordance with the "user registration protocol" illustrated in FIG. 5 in Non-Patent Literature 2, an individual taxi 30 acquires its own public key, secret key, and member certificate that assures the validity of the public key by the management-agent secret key.

[Taxi]

Next, details of a taxi 30 will be described.

As described above, the function that allows a taxi 30 to participate in the taxi dispatch system is realized by the corresponding taximeter 31. Thus, the processing configuration of a taximeter 31 will hereinafter be described.

Figure 7:
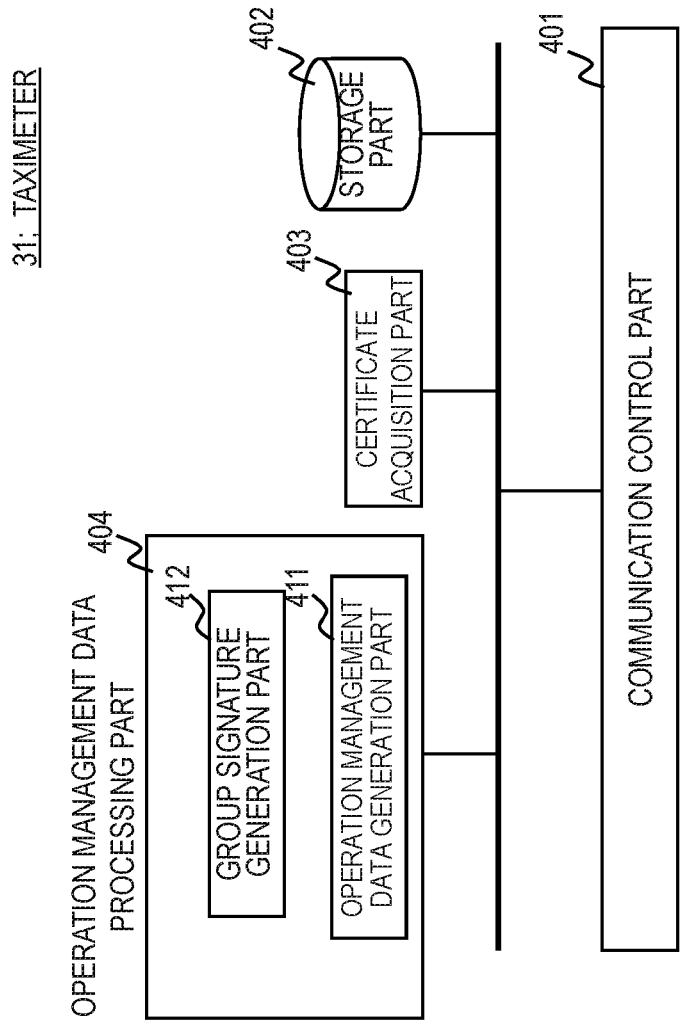
FIG. 7 is a block diagram illustrating an example of a processing configuration of a taximeter according to the first exemplary embodiment.

FIG. 7 is a block diagram illustrating an example of the processing configuration of a taximeter 31 according to the first exemplary embodiment. As illustrated in FIG. 7, the taximeter 31 includes a communication control part 401, a storage part 402, a certificate acquisition part 403, and an operation management data processing part 404.

The communication control part 401 is means for controlling communication with the corresponding smartphone 32 and realizing communication with other apparatuses. The communication control part 401 is also means for sorting messages (packets) received from other apparatuses to various processing module parts or transmitting messages acquired from various processing modules to other apparatuses.

The storage part 402 holds data necessary for generation of a group signature, for example.

The certificate acquisition part 403 is means for creating a member certificate in coordination with the certificate generation part 312 of the corresponding operation management server 20 and acquiring the member certificate from the corresponding operation management server 20. The member certificate acquired from the operation management server 20 is stored in the storage part 402. The certificate acquisition part 403 generates a key (secret key) necessary when generating the member certificate.

The operation management data processing part 404 is means for generating operation management data and transmitting the generated operation management data to the data management system 40.

The operation management data processing part 404 includes two submodules of an operation management data generation part 411 and a group signature generation part 412.

The operation management data generation part 411 is means for generating operation management data. The operation management data includes at least information about the current location of the corresponding taxi and a message notification destination (for example, a mail address). For example, as illustrated in FIG. 8, the operation management data includes information about the location where the corresponding taxi picked up the customer (pick-up location), information about the location where the corresponding taxi dropped off the customer (drop-off location), information about the current location of the corresponding taxi, information about a message notification destination to which a pick-up instruction is transmitted, etc. To make it difficult to determine this data generation entity from the operation management data, it is preferable that a disposable mail address or the like that can be used only in a predetermined period be used as the message notification destination.

In FIG. 8, the operation management data includes a "drop-off location" and a "current location" in consideration of cases where the drop-off location and the current location do not match. The operation management data illustrated in FIG. 8 is only an example, and the content of the operation management data is not limited to what is illustrated in FIG. 8. For example, information about the pick-up location and the drop-off location may be absent in the operation management data. Alternatively, other information (For example, the time when the customer got on the corresponding taxi, the time when the customer got off the corresponding taxi, the mileage, etc.) may be included in the operation management data.

The operation management data generation part 411 acquires the location-related information written in the operation management data, for example, by using the GPS incorporated in the smartphone 32. For example, when the driver performs an operation of inputting information indicating that the driver has picked up the customer on a touch panel or the like, the operation management data generation part 411 sets the location information obtained by the GPS of the smartphone 32 as the pick-up location.

The operation management data may be generated at various timings. For example, the operation management data generation part 411 may generate operation management data at a predetermined time or at predetermined intervals or when the corresponding taxi drops off a customer. Namely, the operation management data may be generated regularly or when an event occurs, e.g., when the corresponding taxi drops off a customer. The operation management data generation part 411 hands over the generated operation management data to the group signature generation part 412.

The group signature generation part 412 is means for generating a group signature to be attached to a message (operation management data) to be transmitted. The group signature generation part 412 generates a group signature from the secret key generated by the certificate acquisition part 403 and the member certificate and privileged-agent public key acquired from the operation management server 20 of the corresponding company. The group signature generation part 412 can generate a group signature in accordance with the "group signature creation algorithm" illustrated in FIG. 6 in Non-Patent Literature 2.

After generating a group signature, the operation management data processing part 404 adds the group signature to the generated operation management data and transmits the operation management data to the data management system 40 (requests addition of the data to the electronic bulletin board). In this operation, the operation management data processing part 404 adds an identifier indicating that this data is to be used in the taxi dispatch system to the operation management data.

As described above, the algorithms and protocol disclosed in Non-Patent Literature 2 can be used, for example, for issuing a member certificate, creating a group signature, and verifying the group signature. Non-Patent Literature 1 discloses further details of these algorithms, etc. Herein, a general operation performed when group signatures are introduced to the taxi dispatch system in conformity with the disclosure of Non-Patent Literature 2 will be described with reference to drawings.

Figure 9:
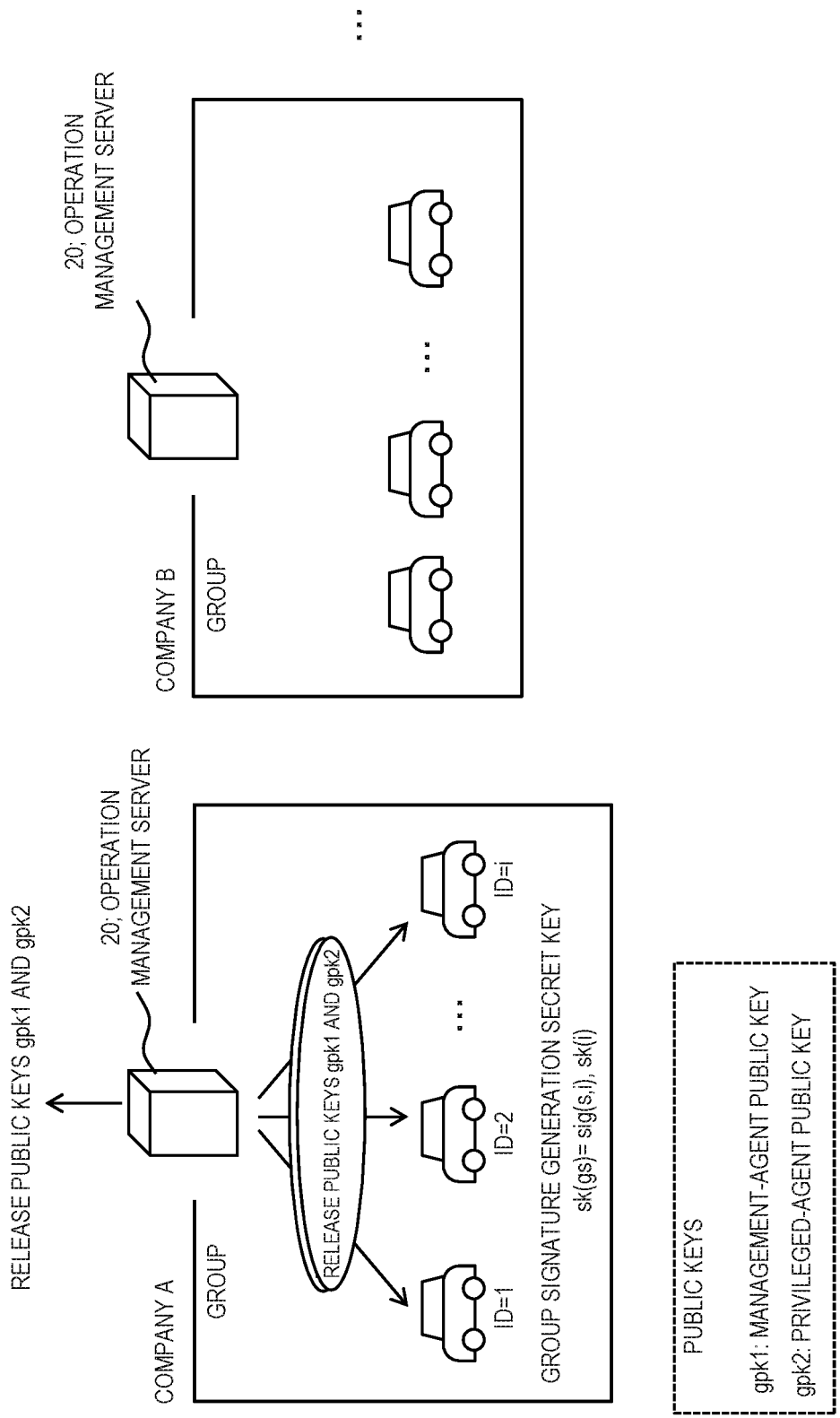
FIG. 9 illustrates generation of group signatures.

Reference characters used in mathematical expressions in the disclosure of the present application are set as follows.
N: product of two primes
A, a, b: elements of residue class ring
g, u: elements of prime field
H: hash function
c: hash value
P, p, q: primes
r, s, x, v, p, T: random numbers
k: integer As illustrated in FIG. 9, an individual one of the taxi companies is treated as a single group. A plurality of members (taxis) belong to a single group (a taxi company). When a taxi company participates in the taxi dispatch system, the corresponding operation management server 20 generates a pair of a management-agent public key and a management-agent secret key and a pair of a privileged-agent public key and a privileged-agent secret key.

Herein, the management-agent public key, the privileged-agent public key, the management-agent secret key, and the privileged-agent secret key are defined as the following expressions (1) to (4).

$$\text{Management-agent public key: } gpk_1=(N,a_0,a_1,a_2,k_e, H) \quad (1)$$

$$\text{Privileged-agent public key: } gpk_2=(g_1,g_2,g_3,P,q) \quad (2)$$

$$\text{Management-agent secret key: } (p_1,p_2)\,s\cdot t\cdot N=p_1p_2 \quad (3)$$

$$\text{Privileged-agent secret key: } y\ s\cdot t\cdot g_2=g_1{}^y \bmod P \quad (4)$$

An individual taxi company (an individual operation management server 20) releases its own management-agent public key and privileged-agent public key. An individual taxi 30 of an individual taxi company is given an identifier (ID; Identification).

As described above, processing relating to member registration (user registration) is performed between an individual taxi company (an individual operation management server 20) and its own taxis 30.

Herein, the public key and secret key of a user are defined as the following expressions (5) and (6).

$$\text{Public key of user: } h = g_2{}^x \bmod P \tag{5}$$

$$\text{Secret key of user: } (x,r)s \cdot t \cdot a_0 a_1{}^x a_2{}^r = A^e \bmod N \tag{6}$$

The certificate acquisition part 403 of an individual taxi 30 generates a secret key as indicated by the above expression (6) and generates information obtained by converting the generated secret key. Specifically, the certificate acquisition part 403 randomly selects x and r' as described in Non-Patent Literature 2 and generates information indicated by the following expression (7).

$$A' \leftarrow a_1{}^x a_2{}^{r'} \bmod N \tag{7}$$

The certificate acquisition part 403 transmits the information (the information obtained by converting the secret key) indicated by the above expression (7) and the public key indicated by the above expression (5) to the corresponding operation management server 20. The certificate generation part 312 of the operation management server 20 generates a member certificate indicated by the following expression (8) in accordance with the protocol described in FIG. 5 in Non-Patent Literature 2.

$$\text{Member certificate: } (A,e) \tag{8}$$

To generate a group signature, an individual taxi 30 prepares a member certificate issued by a corresponding operation management server 20 and a secret key generated as described above. For example, a taxi 30 whose ID=i (i is a positive integer, and the same holds true for the following) prepares a member certificate (Ai, ei) and a secret key sk(i). The member certificate (Ai, ei) transmitted to the taxi and the secret key sk(i) are used for a secret key sk(gs) for generating a group signature relating to the taxi 30. In the following description, the taxi whose ID=i will be denoted as a taxi(i).

Figure 10:
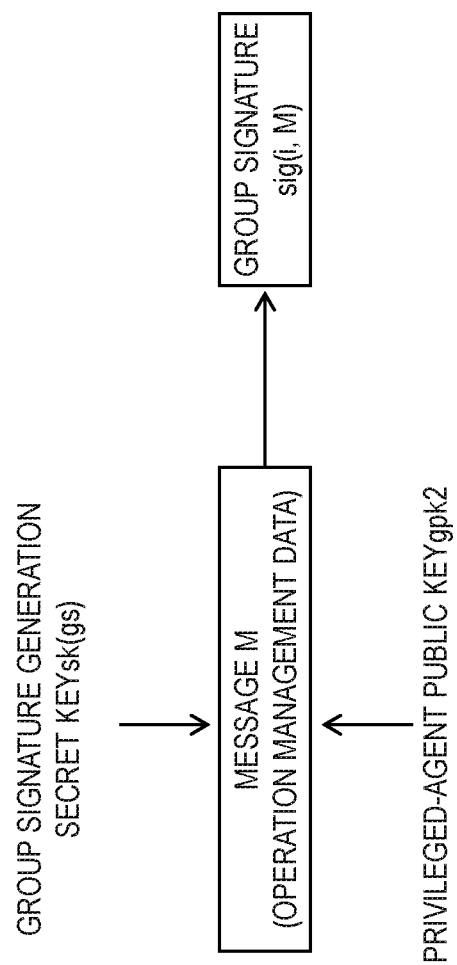
FIG. 10 illustrates generation of a group signature.

The group signature generation part 412 of the taxi(i) generates a group signature. For example, as illustrated in FIG. 10, when the taxi(i) having the above member certificate (Ai, ei) generates a group signature, the taxi(i) generates a group signature sig(i, M) by applying a group signature generation secret key sk(gs) and the privileged-agent public key to a message M, which is operation management data.

More specifically, the group signature generation part 412 randomly selects s and v and calculates information indicated by the following expressions (9) and (10).

$$b \leftarrow a_2{}^s A \bmod N \tag{9}$$

$$(u_1, u_2, u_3) \leftarrow (g_1{}^v, h g_2{}^v, g_3{}^{v+e'}) \bmod P \tag{10}$$

Next, the group signature generation part 412 randomly selects $\rho_x$, $\rho_r$, $\rho'_e$, and $\rho_v$ and obtains a group signature based on the following expressions (11) to (16).

$$\bar{b} \leftarrow b_{\alpha_1}{}^{\rho'_e - \rho_x - \sigma_r}{}_{\alpha_2} \bmod N \tag{11}$$

$$(\overline{u_1, u_2, u_3}) \leftarrow (g_1{}^{\rho_v}, g_2{}^{\rho_v + \rho_x}, g_3{}^{\rho_v + \rho'_e}) \bmod P \tag{12}$$

$$c = H(gpk_1, gpk_2, b, u_1, u_2, u_3, \bar{b}, \overline{u_1}, \overline{u_2}, \overline{u_3}, M) \tag{13}$$

$$\tau_x = \rho_x + cx, \tau_r = \rho_r + c(r + se) \tag{14}$$

$$\tau'_e = \rho'_e + ce', \tau_v = \rho_v + cv \bmod q \tag{15}$$

$$Sig = (b, u_1, u_2, u_3, c, \tau_x, \tau_r, \tau'_e, \tau_v) \tag{16}$$

This group signature has a zero-knowledge proof function that assures that the taxi(i) has a member certificate issued by an entity having a correct management-agent secret key corresponding to a management-agent public key of a corresponding taxi company and assures that the member certificate can correctly be determined by the entity having a correct privileged-agent secret key corresponding to a privileged-agent public key.

Next, an outline of verification and tracking that uses a group signature will be described. As described above, the signature verification part 211 of the dispatch server 10 verifies a group signature attached to operation management data. Specifically, the signature verification part 211 verifies a group signature by using the management-agent public key and privileged-agent public key released by the corresponding taxi company. More specifically, the signature verification part 211 verifies a group signature based on whether the following expressions (17) to (19) are established.

$$\bar{b} \leftarrow b^{c2^k e^{+r'}} a_0{}^{-e} a_1{}^{-\tau_x} a_2{}^{-\tau_r} \bmod N \tag{17}$$

$$(\overline{u_1, u_2, u_3}) \leftarrow (u_1{}^{-c} g_1{}^{\tau_v + \tau_x}, u_3{}^{-c} g_3{}^{\tau_v + \tau'_e}) \bmod P \tag{18}$$

$$c = H(gpk_1, gpk_2, b, u_1, u_2, u_3, \bar{b}, \overline{u_1}, \overline{u_2}, \overline{u_3}, M) \tag{19}$$

For example, if the validity of a group signature is assured by the management-agent public key and the privileged-agent public key of the company A, it is determined that the corresponding operation management data to which the group signature has been attached is from a valid member of the company A participating in the taxi dispatch system. The company A can determine which one of the taxis belonging thereto has generated the operation management data from the group signature (can determine the corresponding taxi belonging to the company A).

In this way, by verifying a group signature with the corresponding management-agent public key and privileged-agent public key, it is possible to determine whether the taxi 30 that has written the operation management data on the electronic bulletin board is a member of a taxi company having a valid certificate on the system. However, with this verification only, the dispatch server 10 or the like cannot determine the taxi 30 that has written the operation management data on the electronic bulletin board. Namely, by using a group signature, the information that the dispatch server 10 and the like can grasp is limited to the information about the validity of the taxi 30 that has written the operation management data on the electronic bulletin board. In addition, even when the information is limited in this way, the dispatch server 10 can be operated without a problem in the system as long as the dispatch server 10 is able to determine the validity of the operation management data (assure that the taxi is a member of a taxi company that is eligible to participate in the system) and is able to grasp the current location and a message notification destination of the taxi 30.

In contrast, since an individual taxi company as a manager of a corresponding group uses its own privileged-agent secret key, the individual taxi can uniquely determine an individual taxi 30 that has added a group signature. Specifically, the operation management server 20 of an individual taxi company can determine a taxi 30 that has generated a group signature by calculating the following expression (20).

$$h = u_2/u_1^y \qquad (20)$$

By converting data included in a group signature by using a privileged-agent secret key, a taxi company (an operation management server 20) can extract the member certificate of a corresponding taxi 30. The taxi company can determine the ID of the taxi 30 from the extracted member certificate. Namely, the taxi company can acquire operation management data from the data management system 40 and uniquely determine the taxi 30 that has transmitted the operation management data from the corresponding group signature (can track the member). As a result, the taxi company can grasp the details of each of its taxis 30, such as the operational status and the working status.

[Management Server]

Next, details of the management servers 50 included in the data management system 40 will be described.

Figure 11:
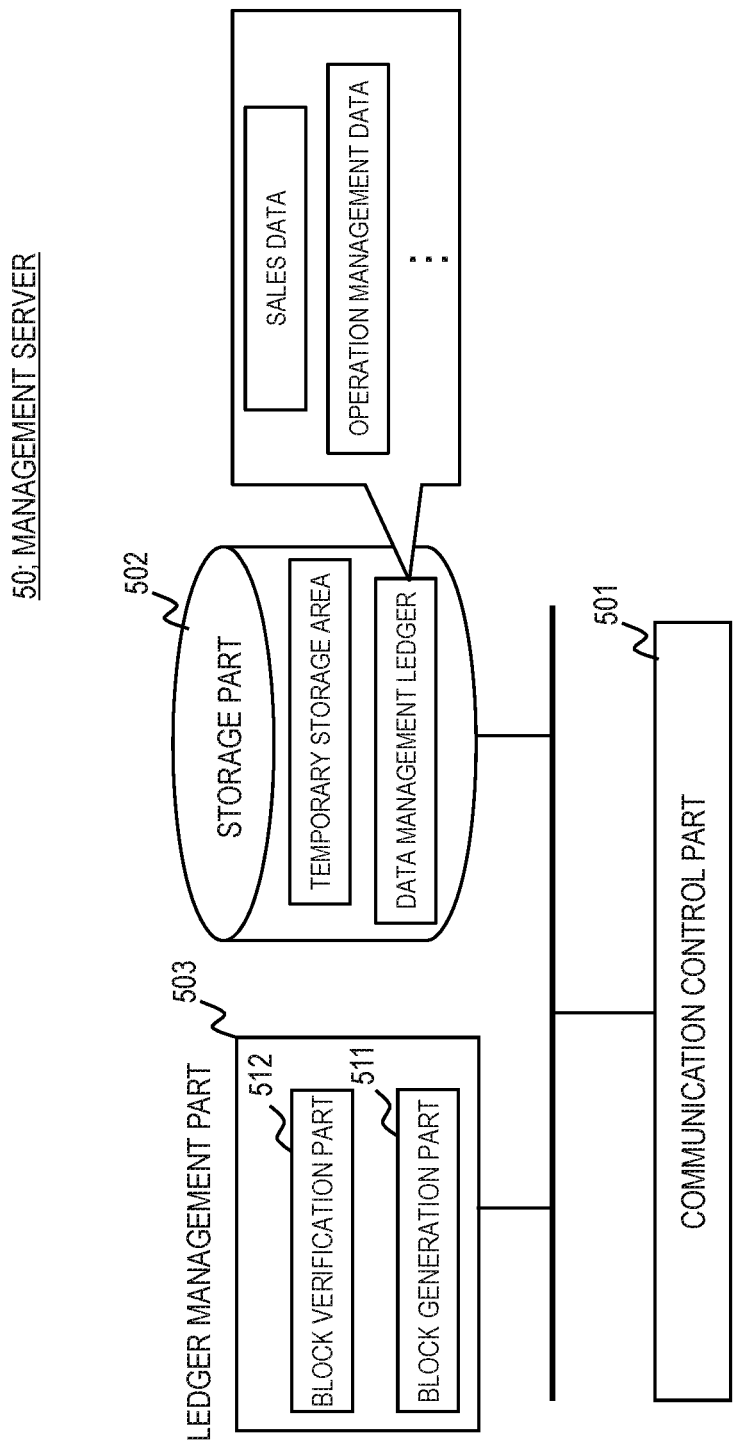
FIG. 11 is a block diagram illustrating an example of a processing configuration of a management server according to the first exemplary embodiment.

FIG. 11 is a block diagram illustrating an example of a processing configuration of a management server 50 according to the first exemplary embodiment. As illustrated in FIG. 11, the management server 50 includes a communication control part 501, a storage part 502, and a ledger management part 503.

The communication control part 501 is means for realizing communication with other apparatuses. The communication control part 501 is also means for sorting messages (packets) received from other apparatuses to various processing module parts or transmitting messages acquired from various processing modules to other apparatuses.

The storage part 502 is means for holding information necessary for processing performed by various processing modules. The storage part 502 includes a temporary storage area in which data is temporarily stored and an area in which a data management ledger is stored.

The ledger management part 503 is means for processing access requests from the dispatch server 10 or the taxis 30 to the electronic bulletin board. Specifically, for example, when the management server 50 receives a request for writing operation management data on the electronic bulletin board from a taxi 30, the ledger management part 503 adds the operation management data in the data management ledger stored in the storage part 502. In addition, when the ledger management part 503 receives a request for reading data on the electronic bulletin board from an external apparatus, the ledger management part 503 searches the data management ledger by using an identifier attached to the request (an identifier indicating that the data is data for the taxi dispatch system) as a key and extracts the data to which the identifier is attached (namely, the operation management data). In this operation, when a read range is specified for the operation management data, the ledger management part 503 extracts the operation management data that matches the read range.

The ledger management part 503 transmits the extracted operation management data to the dispatch server 10, etc.

The ledger management part 503 includes two submodules of a block generation part 511 and a block verification part 512.

The block generation part 511 shares its data management ledger with the other management servers 50 and generates a block for managing the data management ledger.

When the ledger management part 503 acquires operation management data from a taxi 30 or the like, the ledger management part 503 stores the acquired operation management data in the temporary storage area in the storage part 502. Next, the block generation part 511 generates "validity assurance data" from the header of the immediately previously generated block and the data stored in the temporary storage area (for example, operation management data or sales data; data added to the data management ledger). For example, the block generation part 511 calculates a hash value for the added data, the header of the previous block, and the validity assurance data and generates, as the validity assurance data, a value (a so-called nonce) that causes the calculated hash value to match a predetermined rule(s). In addition, the validity assurance data includes an electronic signature of the management server 50 that has generated the block.

Figure 12:
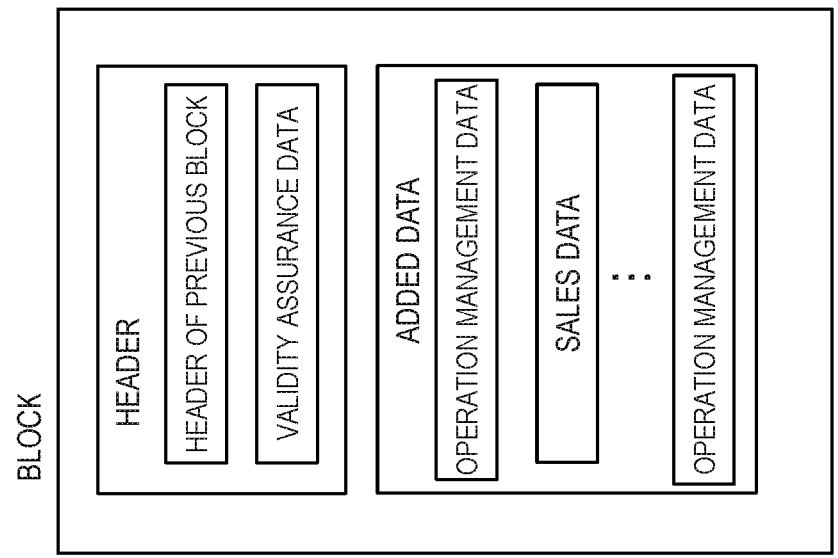
FIG. 12 illustrates an example of a block generated by a management server.

The block generation part 511 generates a block having a header including the header of the immediately previously generated block and validity assurance data as described above. Specifically, a block as illustrated in FIG. 12 is generated.

After generating a block, the block generation part 511 adds the block to its data management ledger. In addition, the block generation part 511 distributes (transmits) the generated block to the other management servers 50 via the communication control part 501.

When the communication control part 501 of the management server 50 receives a block from any one of the other management servers 50, the communication control part 501 hands over the acquired block to the block verification part 512.

The block verification part 512 is means for verifying the validity of a block transmitted from any one of the other management servers 50, based on the data management ledger (block) stored in the corresponding storage part 502. Specifically, the block verification part 512 of a management server 50 that has received a block verifies the validity of the received block by using the header of the block generated by the management server 50 that has transmitted the block and the header of the previously generated block managed by the corresponding management server (the management server 50 that has received the block).

First, the block verification part 512 checks whether an electronic signature of the management server 50 that has transmitted the block is attached to the validity assurance data included in the received block and determines "the header of the previous block" written in the received block based on the data management ledger managed by the corresponding management server. Next, the block verification part 512 checks whether the validity assurance data within the header match by using the added data within the received block and the header of the previous block as input information (whether the validity assurance data matches a predetermine rule(s)).

If the consistency of the validity assurance data is confirmed, the block verification part 512 determines that the block transmitted from another management server 50 is valid. However, if the consistency of the validity assurance data cannot be confirmed, the block verification part 512 determines that the block transmitted from another management server 50 is invalid.

If the block verification part 512 determines that the block transmitted from another management server 50 is valid, the ledger management part 503 updates the data management ledger in the storage part 502 (adds the block including the added data). Namely, the block verification part 512 performs processing for reflecting the addition of the data to the ledger of another management server 50 on the ledger of the corresponding management server. However, if the block verification part 512 determines that the block transmitted from another management server 50 is invalid, the block verification part 512 discards the block.

In addition, the block verification part 512 notifies the management server 50, which has transmitted the block, of information about the verification result (whether the received block is valid or invalid).

Figure 13:
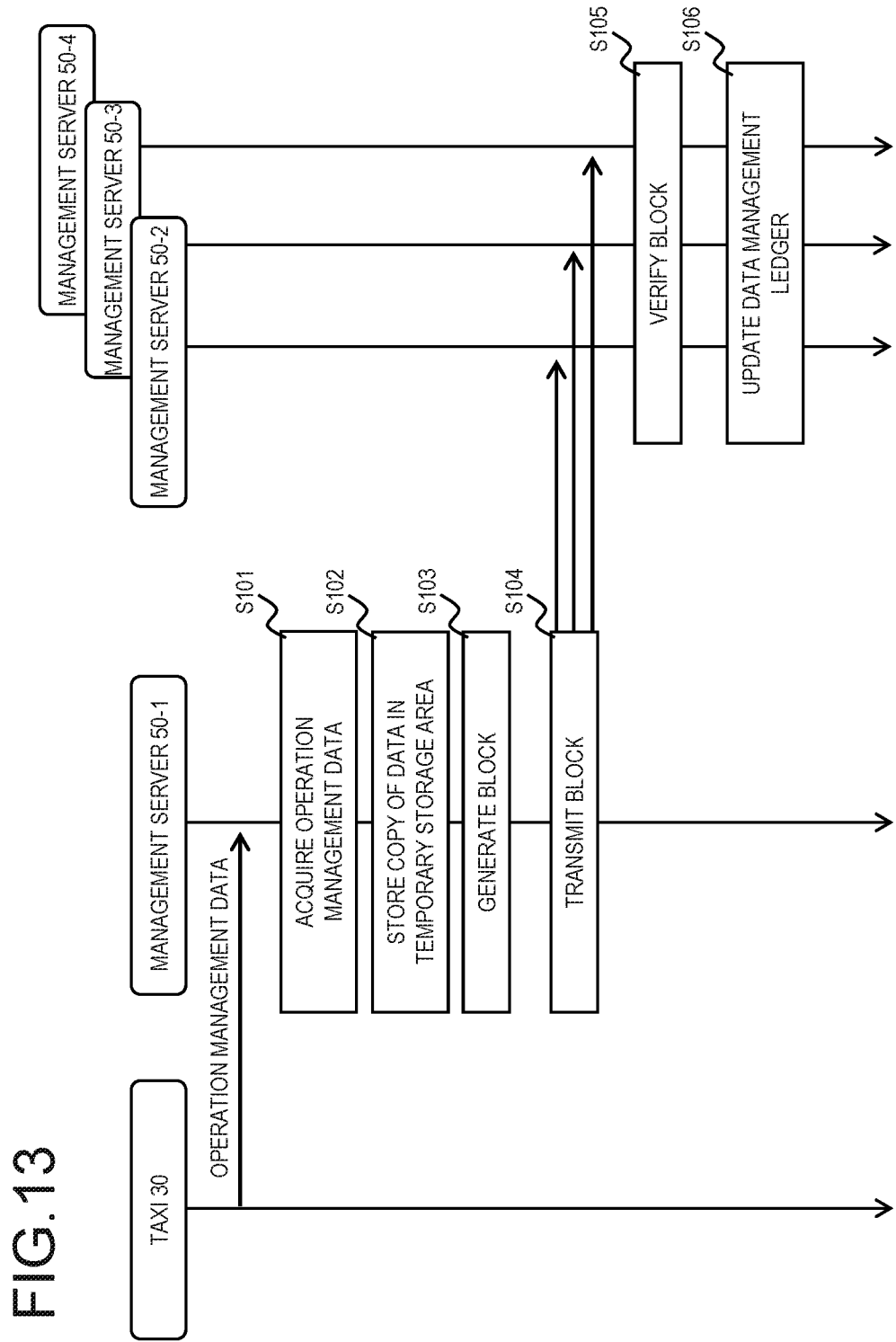
FIG. 13 is a sequence diagram illustrating an example of an operation of management servers according to the first exemplary embodiment.

An outline of an operation of a management server 50 will be described with reference to a sequence diagram illustrated in FIG. 13. FIG. 13 illustrates a case where the management server 50-1 acquires operation management data from a taxi 30 and adds the data to the corresponding data management ledger.

When the management server 50-1 acquires operation management data from a taxi 30 (step S101), the management server 50-1 makes a copy of the data and stores the copy in the temporary storage area in the corresponding storage part 502 (step S102).

Next, when a condition is satisfied, e.g., when a predetermined amount of the data copied in the temporary storage area is accumulated, the management server 50-1 generates a block as described above based on the operation management data stored in the temporary storage area (step S103). Next, the management server 50-1 transmits the generated block to the other management servers 50-2 to 50-4 (step S104).

An individual one of the management servers 50-2 to 50-4 that have received the block verifies the block generated by the management server 50-1 (step S105). If the validity of the block is confirmed, an individual one of the management servers 50-2 to 50-4 updates its own data management ledger (step S106). In this way, when at least one of the plurality of management servers 50 included in the data management system 40 adds data to its data management ledger, the data is reflected on the data management ledgers in the other management servers 50.

If a management server 50 cannot confirm the validity of the block transmitted from another management server 50, the receiving management server 50 discards the block and notifies the management server 50, which has transmitted the block, of this verification result. If the ledger management part 503 of the transmitting management server 50 is notified of this verification result, the ledger management part 503 restores the pre-block-transmission status of the data management ledger.

Next, an operation of the taxi dispatch system will be described.

Figure 14:
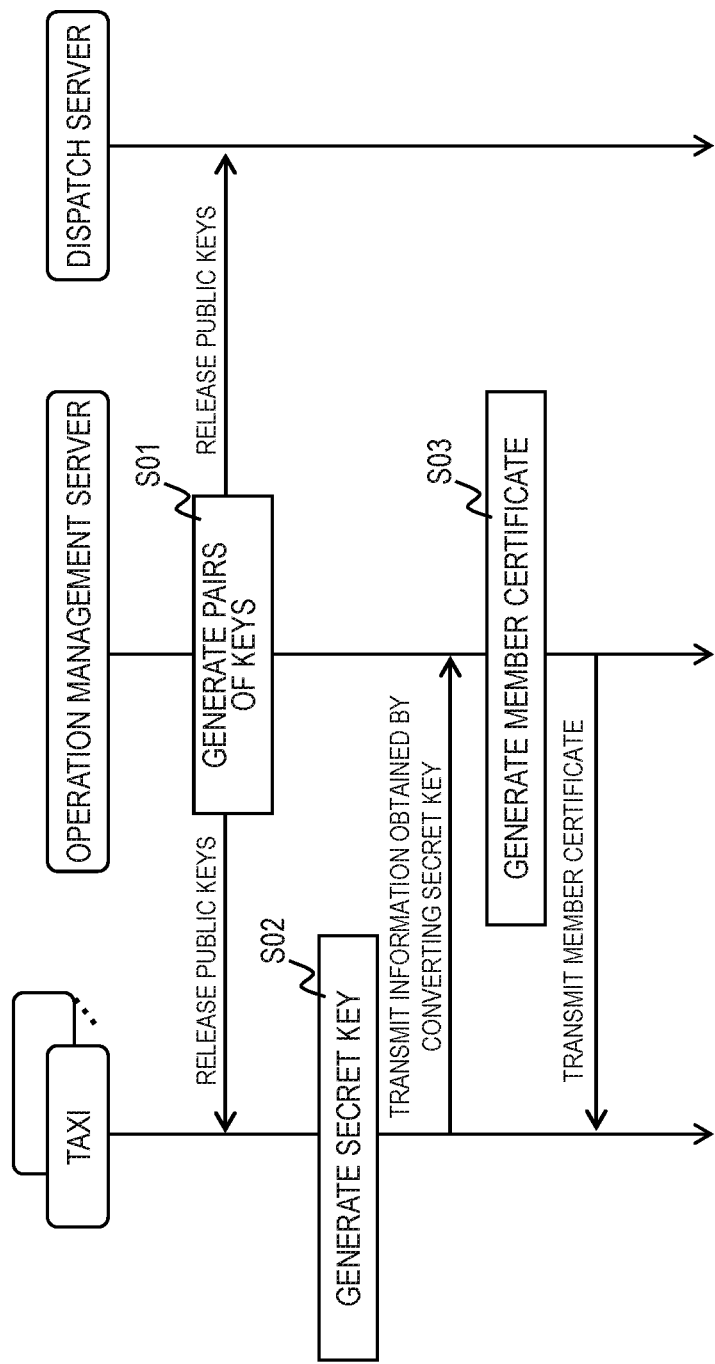
FIG. 14 is a sequence diagram illustrating an example of a setup operation in the taxi dispatch system according to the first exemplary embodiment.

FIG. 14 is a sequence diagram illustrating a setup operation in the taxi dispatch system.

Before the operation of the taxi dispatch system is started, an individual taxi company generates the above two pairs of public keys and secret keys (step S01). Next, the individual taxi company releases its management-agent public key and privileged-agent public key.

An individual taxi 30 generates a secret key necessary for generation of a group signature (step S02). Next, the individual taxi 30 transmits information, for example, obtained by converting the generated secret key to its taxi company (operation management server 20).

The taxi company (operation management server 20) generates a signature by using its privileged-agent secret key with respect to the information obtained by converting the acquired secret key and generates a member certificate (step S03). The generated member certificate is transmitted to its taxis 30.

The setup processing illustrated in FIG. 14 is performed per taxi company participating in the taxi dispatch system, and consequently, the preparation of the system operation is completed. In addition, when a taxi company participates in the system, this setup processing illustrated in FIG. 14 is performed for this taxi company.

Next, a normal operation (taxi dispatch processing) in the taxi dispatch system will be described.

Figure 15:
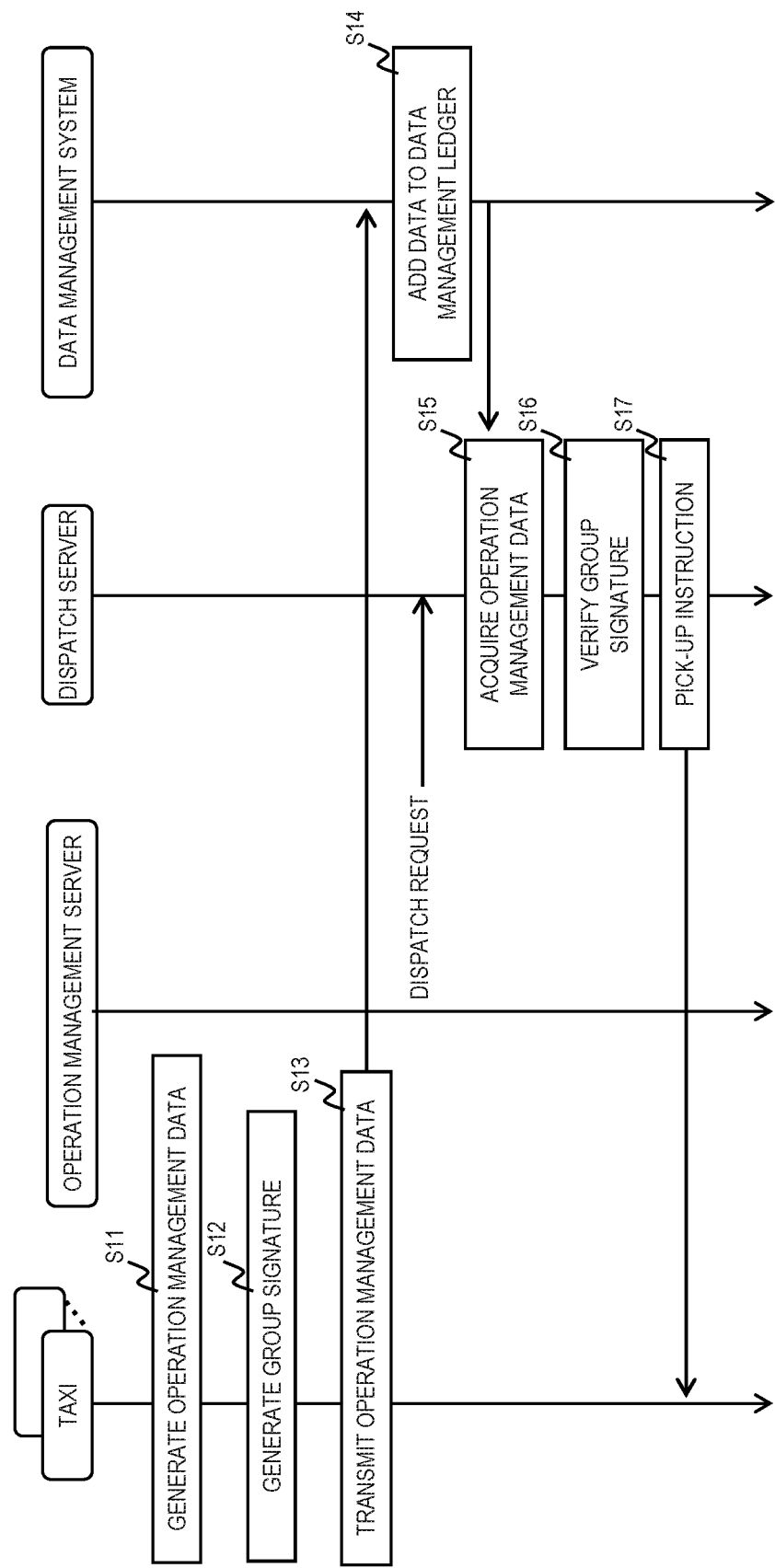
FIG. 15 is a sequence diagram illustrating an example of an operation performed when the taxi dispatch system according to the first exemplary embodiment is operated.

FIG. 15 is a sequence diagram illustrating an example of an operation performed when the taxi dispatch system is operated.

When a predetermined condition(s) is satisfied, a taxi 30 within the service providing area of the taxi dispatch system generates operation management data (step S11). Next, the taxi 30 generates a group signature for the generated operation management data (step S12). Next, the taxi 30 attaches the group signature to the operation management data and transmits the data to the data management system 40 (step S13). A management server 50 in the data management system 40 adds the received operation management data to its data management ledger (step S14).

By repeating the processing in steps S11 to S14, information including the current locations of the individual taxis 30 is accumulated on the electronic bulletin board of the data management system 40.

When the dispatch server 10 receives a dispatch request including the current location of a customer, the dispatch server 10 acquires a predetermined range of operation management data from the data management system 40 (step S15). Next, the dispatch server 10 verifies the group signatures of the respective operation management data acquired (step S16). Namely, the dispatch server 10 determines whether an individual one of the operation management data is operation management data generated by a taxi 30 that belongs to a taxi company participating in the system. Among the operation management data whose validity has been confirmed, the dispatch server 10 determines the current location of a taxi 30 close to the customer who has made the dispatch request and instructs the taxi 30 to pick up the customer (step S17).

As described above, according to the first exemplary embodiment, the group signatures are used to determine the validity of the entity that has generated the operation management data. By using the group signatures, it is possible to determine whether the entity that has generated the operation management data is a member of a taxi company that is eligible to participate in the taxi dispatch system. In addition, with this verification alone using the group signatures, the taxi 30 that has generated the operation management data cannot uniquely be determined. Only the taxi company, which is the manager of the corresponding group, can make this determination. Namely, while the validity of the operation management data can be verified, the information obtained from this data can appropriately be limited.

Second Exemplary Embodiment

Next, a second exemplary embodiment will be described in detail with reference to drawings.

According to the first exemplary embodiment, the dispatch server 10 assures that an entity that has generated operation management data is a member of a taxi company by using a corresponding group signature. In this operation, the dispatch server 10 verifies the group signature by using the corresponding management-agent public key and privileged-agent public key released by the taxi company.

In this way, since the other taxi companies can also obtain the management-agent public key and privileged-agent public key released by the taxi company, the other companies can also verify the group signature attached to the operation management data. For example, as illustrated in FIG. 9, since a company B can also obtain the management-agent public key and privileged-agent public key of the company A, if the company B can verify a group signature attached by a taxi 30 that belongs to the company A by using the management-agent public key and privileged-agent public key of the company A, the company B can obtain the fact that the operation management data to which the group signature is attached has been generated by a taxi 30 of the company A. By repeating the verification as described above on the operation management data and the corresponding group signatures stored in the data management system 40, the company B could grasp the operational statuses of the taxis 30 of the company A.

If the company B can grasp the operational statuses of the taxis 30 of the company A, by analyzing the information about the operational statuses, the company B could determine a business policy or the like of the company A. For example, the company B could create information about the company A, such as the working statuses of the taxis per time period and area.

Originally, the taxi companies participating in the taxi dispatch system have a competitive relationship. Thus, it is not desirable that the information as described above be created. Namely, according to the first exemplary embodiment, by using a group signature, while the information obtained from the corresponding operation management data and signature is limited to the company to which the corresponding taxi belongs, this limitation could be insufficient. Namely, the dispatch server only needs to determine whether the agent that has generated the operation management data is eligible to participate in the taxi dispatch system. Thus, it is desirable that the group (taxi company) to which the agent that has generated the operation management data should not be obtained from the group signature.

The second exemplary embodiment solves the above problem by separating the member registration function (the function of issuing the member certificates) and the tracking function (function of identifying the taxis of an individual company) by using group signatures. Specifically, according to the second exemplary embodiment, the taxi association performs member registration. According to the second exemplary embodiment, as in the first exemplary embodiment, an individual taxi company can determine its taxis from corresponding group signatures.

Figure 16:
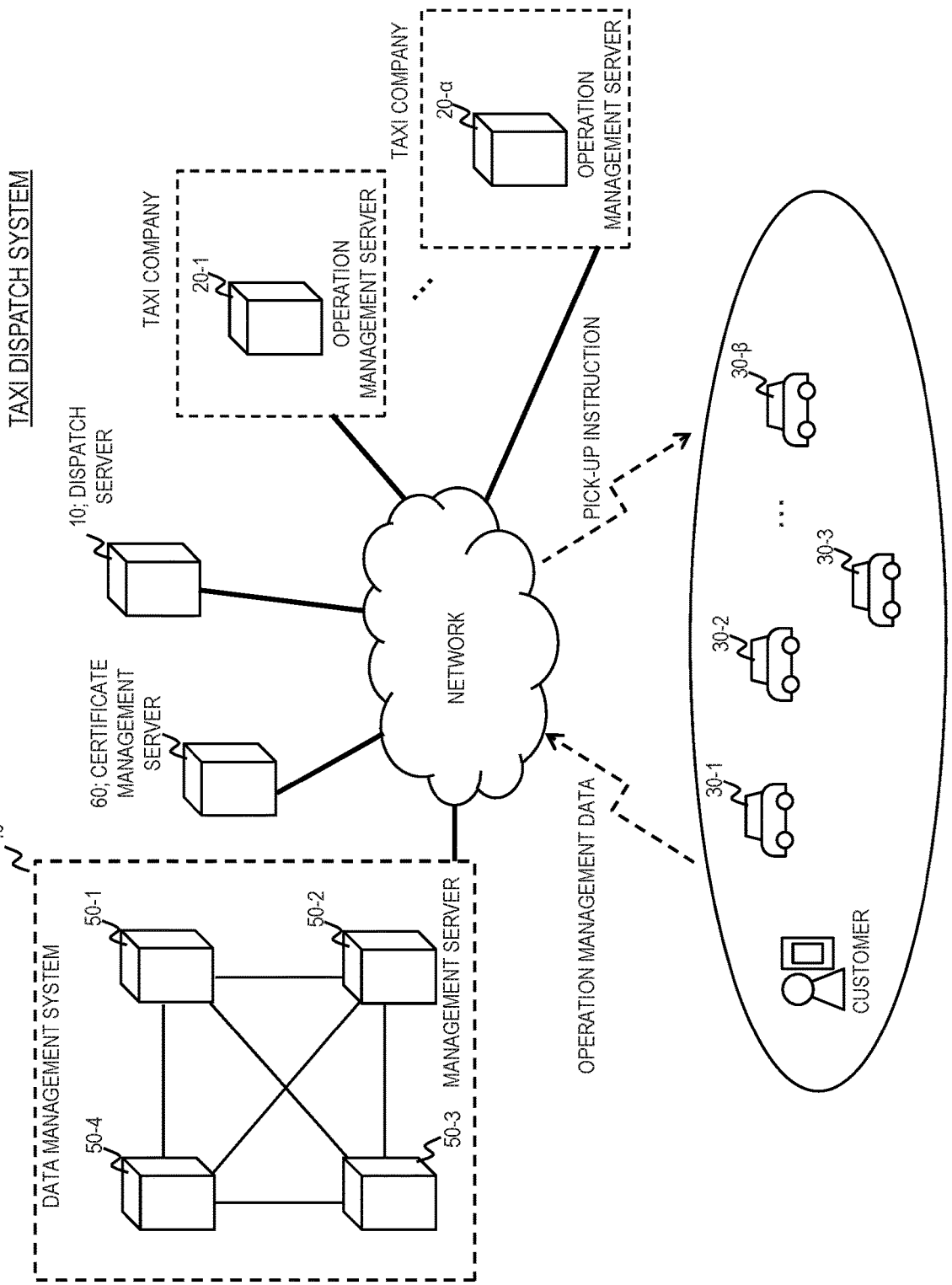
FIG. 16 illustrates an example of a system configuration of a taxi dispatch system according to a second exemplary embodiment.

According to the second exemplary embodiment, in addition to the system configuration as illustrated in FIG. 2, a certificate management server 60 is additionally installed at the taxi association or the like (see FIG. 16).

Figure 17:
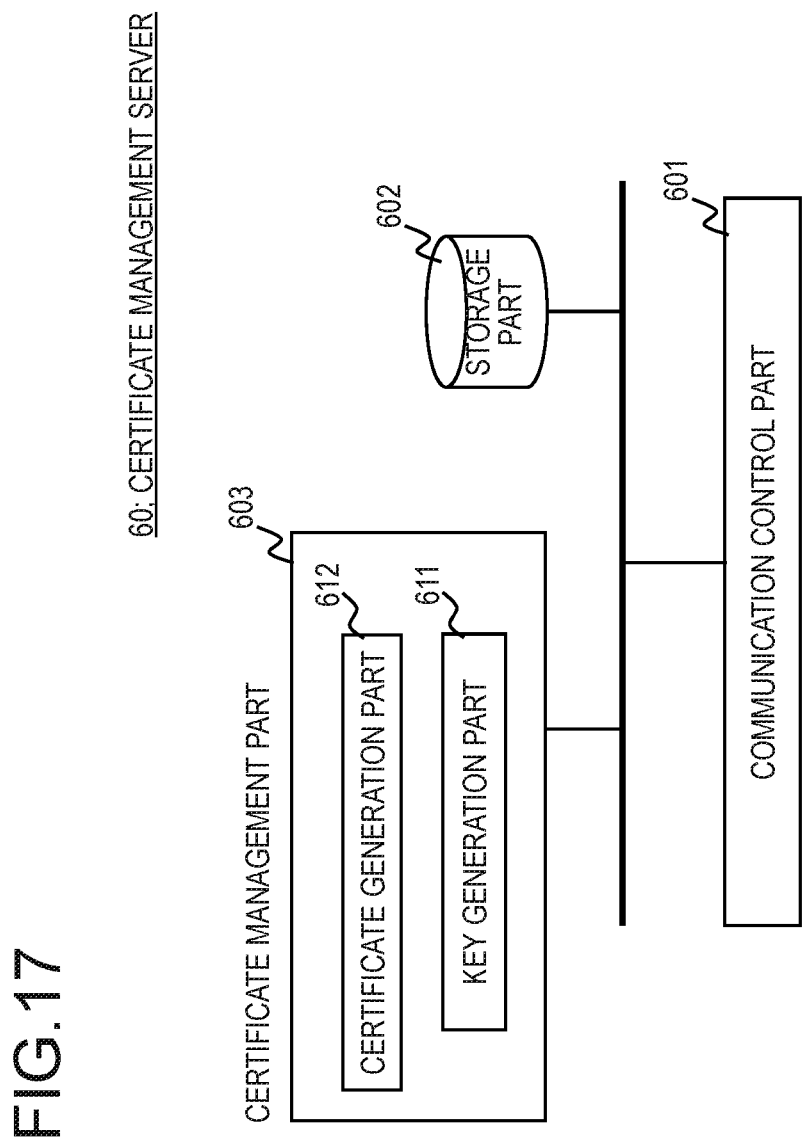
FIG. 17 illustrates an example of a processing configuration of a certificate management server according to the second exemplary embodiment.

FIG. 17 illustrates an example of a processing configuration of the certificate management server 60 according to the second exemplary embodiment. The certificate management server 60 includes a communication control part 601 and a storage part 602, as is the case with the other apparatuses. The certificate management server 60 also includes a certificate management part 603.

The certificate management part 603 includes two submodules of a key generation part 611 and a certificate generation part 612. An operation of the certificate management server 60 including these submodules will be described below.

Figure 18:
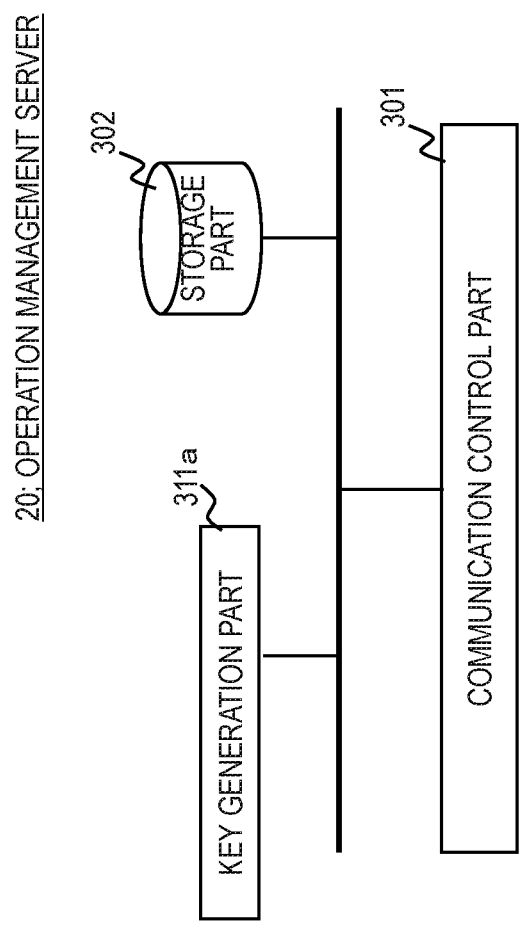
FIG. 18 illustrates an example of a processing configuration of an operation management server according to the second exemplary embodiment.

According to the first exemplary embodiment, while an individual operation management server 20 generates member certificates, since the certificate management server 60 has this function, the individual operation management server 20 according to the second exemplary embodiment does not have any certificate generation part (see FIG. 18).

However, as will be described below, since the individual operation management server 20 has a function of generating and releasing its privileged-agent public key, the individual operation management server 20 according to the second exemplary embodiment includes a key generation part 311a that generates its privileged-agent public key and privileged-agent secret key.

Next, generation of a group signature according to the second exemplary embodiment will be described with reference to drawings.

Figure 19:
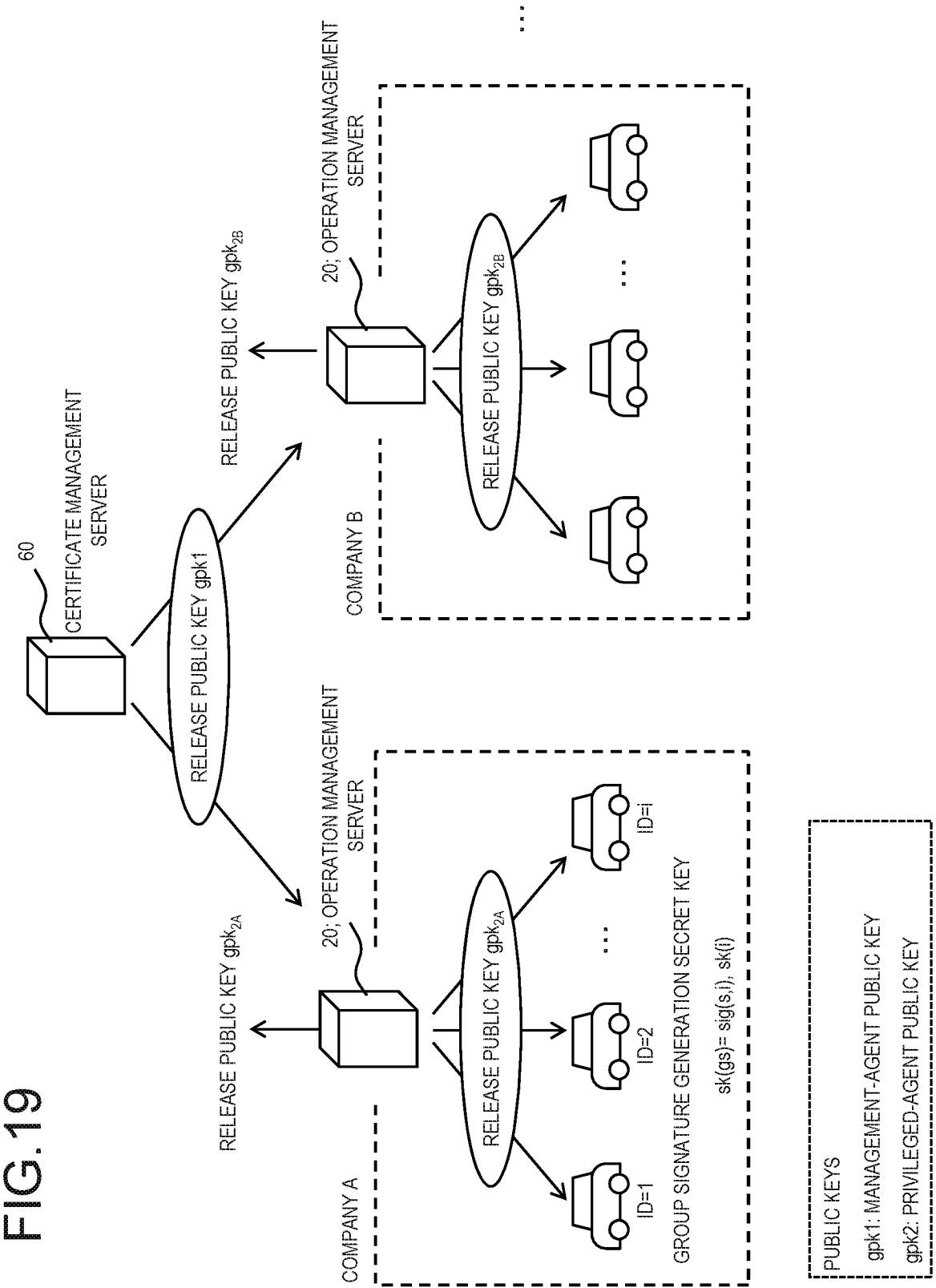
FIG. 19 illustrates generation of group signatures according to the second exemplary embodiment.

FIG. 19 illustrates generation of a group signature according to the second exemplary embodiment. As illustrated in FIG. 19, the key generation part 611 of the certificate management server 60 generates a pair of a management-agent public key and a management-agent secret key and releases the management-agent public key. In addition, the operation management server 20 (key generation part 311a) of an individual taxi company generates a pair of a privileged-agent public key and a privileged-agent secret key and releases the privileged-agent public key.

The individual taxi company and its taxis 30 perform generation and acquisition of member certificates, as in the first exemplary embodiment.

While a taxi 30 generates a group signature attached to operation management data, the way of generating the group signature according to the second exemplary embodiment is different from that according to the first exemplary embodiment. According to the first exemplary embodiment, when a group signature sig(i, M) attached to operation management data (a message M) is generated, the group signature is generated by using a member certificate and the privileged-agent public key of the corresponding company (see FIG. 10). In contrast, according to the second exemplary embodiment, to keep the corresponding privileged-agent public key secret, an individual taxi 30 inputs the privileged-agent public keys of all the taxi companies (see FIG. 20).

As described in Non-Patent Literature 2, a group signature is a technique for indicating that "a correctly registered public key has been encrypted and a user is the owner of the public key without leaking any knowledge about the public key". To realize this technique, it is necessary that the corresponding agent attach "zero-knowledge proof data that proves that his/her own public key has been encrypted, that there is a member certificate for the public key, and that the person that has encrypted the public key has a secret key corresponding to this public key". However, in this case, it is necessary that the verifier be notified of the privileged-agent public key used to encrypt the public key. However, by notifying the verifier of this fact (the privileged-agent public key used), the taxi company to which the taxi 30 belongs becomes apparent.

To solve this inconvenience or problem, the group signature generation part 412 according to the second exemplary embodiment inputs the privileged-agent public keys of all the taxi companies (gpk$_{2A}$, gpk$_{2B}$, . . . in the example in FIG. 19) for generation of a group signature. Namely, the corresponding agent attaches "zero-knowledge proof data that proves that his/her own public key has been encrypted by using any one of the privileged-agent public keys, that there is a member certificate for the public key, and that the person (the entity) that has encrypted the public key has a secret key corresponding to this public key".

By making this change, it is possible to issue a group signature by using a member certificate issued by the taxi association while keeping the taxi company to which the corresponding taxi belongs secret. In addition, only the taxi company can determine the corresponding taxi.

Herein, the zero-knowledge proof indicating that "data has been encrypted by any one of a plurality of public keys" is so-called ORproof, and the configuration can be obtained as follows.

For example, if the zero-knowledge proof is configured based on expressions (1) to (20) described in the above first exemplary embodiment, the following configuration is obtained. In the following description, a case in which a taxi 30 that belongs to the taxi company A generates a group signature will be described as an example. In addition, the following example assumes that three taxi companies (the companies A to C) participate in the taxi dispatch system. However, the number of taxi companies (groups) in the system is of course not limited to 3.

Among the management-agent public key, the privileged-agent public key, the management-agent secret key, and the privileged-agent secret key indicated by the above expressions (1) to (4), the privileged-agent public key and the privileged-agent secret key according to the second exemplary embodiment are different from those according to the first exemplary embodiment. Specifically, as many privileged-agent public keys as the taxi companies are prepared. Each of the privileged-agent public keys is indicated by expression (2). In the privileged-agent public key indicated by expression (2), $(g_1, g_3, P, q)$ are information about parameters and commonly set for all the taxi companies. The element $g_2$ generated based on the privileged-agent secret key differs from taxi company to taxi company. For example, the privileged-agent public key of the company A is set as indicated by expression (21), and the privileged-agent public key of the company B is set as expression (22).

Privileged-agent public key of company A: $gpk_{2A}=$
$(g_1, g_{2A}, g_3, P, q)$ (21)

Privileged-agent public key of company B: $gpk_{2B}=$
$(g_1, g_{2B}, g_3, P, q)$ (22)

In the following description, the privileged-agent secret key of the taxi company A corresponding to expression (21) is set as yA, and the privileged-agent secret key of the taxi company B corresponding to expression (22) is set as yB.

The public key of a user (the public key of an individual taxi 30) indicated by the above expression (5) is generated based on the privileged-agent public key of the corresponding company. For example, the user public key of a taxi 30 of the company A is indicated by expression (23), and the user public key of a taxi 30 of the company B is indicated by expression (24).

Public key of taxi of company A: $h=g_{2A}{}^x \bmod P$ (23)

Public key of taxi of company B: $h=g_{2B}{}^x \bmod P$ (24)

In this way, a user public key is generated from a value obtained by raising element $g_2$ (company A; element $g_{2A}$, company B; element $g_{2B}$) included in the privileged-agent public key of the corresponding taxi company to the x-th power.

The member certificates are issued in the same way as that according to the first exemplary embodiment. However, the user public key h of an individual taxi 30 includes information obtained by raising the element $g_2$ included in the privileged-agent public key of the corresponding taxi company to the x-th power.

Next, regarding the generation of a group signature indicated by the above expressions (9) to (16), the difference between the first and second exemplary embodiments will be indicated as follows.

Regarding expression (10) described in the first exemplary embodiment, the element used to generate $u_2$ according to the second exemplary embodiment differs from that according to the first exemplary embodiment. For example, a taxi 30 of the company A uses the following expression (25).

$$(u_1, u_2, u_3) \leftarrow (g_1{}^v, hg_{2A}{}^v, g_3{}^{v+e'}) \bmod P \quad (25)$$

When a taxi 30 of the company B generates a group signature, if the above expression (25) is calculated, $g_{2A}$ in expression (25) is replaced by $g_{2B}$.

In addition, according to the second exemplary embodiment, in the calculations of expressions (13) to (16), $c_B$ and $c_C$ are also randomly selected in addition to $\rho_x$, $\rho_r$, $\rho_e{}'$, and $\rho_v$, and these are used to calculate a group signature. $c_B$ and $c_C$ are randomly selected assuming that a hash value c calculated by the following expression (27) is divided into a challenge value $c_A$ for the company A, a challenge value $c_B$ for the company B, and a challenge value $c_C$ for the company C. The zero-knowledge proof is established by three processes of a commitment, a challenge, and a response, and normally, a single hash value is used for the challenge. In ORproof, to prove A or B or C, the challenge is separated to a challenge for A, a challenge for B, and a challenge for C, and the zero-knowledge proof that is established if any one of the challenges can be answered correctly is configured. Thus, according to the second exemplary embodiment, the normal challenge value (the hash value c) is divided to values for the respective taxi companies. According to the second exemplary embodiment, due to the property that the zero-knowledge proof can be simulated, the challenges ($c_B$ and $c_C$ in the above example) that cannot be proved by the target agent are randomly generated and the challenge ($c_A$ in the above example) that can be proved by the target agent is calculated based on the hash value c ($c-c_B-c_C$). In addition, to realize the ORproof, as many elements of the upper bar $u_2$ necessary to prove the management-agent public key as the taxi companies are duplicated. Namely, according to the second exemplary embodiment, the above expression (12) is changed to the following expression (26).

$$(\overline{u_1}, \overline{u_{2A}}, \overline{u_{2B}}, \overline{u_{2C}}, \overline{u_3}) \leftarrow \quad (26)$$
$$\left(g_1^{\rho_v}, g_{2A}^{\rho_v+\rho_x}, u_2^{-c_B} g_{2B}^{\rho_x+c_B^x}, u_{2B}^{-c_C}, u_{2C}^{\rho_x+c_C^x}, g_3^{\rho_v+\rho_e'}\right) \bmod P$$

A value obtained from the above expression (26) is used as a part of the input parameters of a hash function H as indicated by the following expression (27).

$$c = H(gpk_1, gpk_{2A}, gpk_{2B}, gpk_{2C}, b, u_1, u_2, u_3, \overline{b}, \overline{u_1}, \overline{u_{2A}}, \overline{u_{2B}}, \overline{u_{2C}}, \overline{u_3}, M) \quad (27)$$

As described above, according to the second exemplary embodiment, the privileged-agent public keys of all the taxi companies are used for generation of a group signature. Thus, in place of the privileged-agent public key $gpk_2$ in expression (13) described in the first exemplary embodiment, the privileged-agent public keys $gpk_{2A}$, $gpk_{2B}$, and $gpk_{2C}$ of the taxi companies are used as the corresponding input parameters in the above expression (27).

In addition, in place of $\tau_x$ and $\tau_v$ obtained from expressions (14) and (15) described in the first exemplary embodiment, in the second exemplary embodiment, $\tau_{xA}$, $\tau_{xB}$, $\tau_{xC}$, $\tau_{\upsilon A}$, $\tau_\upsilon$, and $\tau_{\upsilon C}$ are calculated from the following expressions (28) and (29).

$$\tau_{xA}=\rho_x+c_A X, \tau_{xB}=\rho_x+c_B X, \tau_{xC}=\rho_x+c_C x \quad (28)$$

$$\tau_{\upsilon A}=\rho_\upsilon+c_A \upsilon, \tau_{\upsilon B}=\rho_\upsilon+c_B \upsilon, \tau_{\upsilon C}=\rho_\upsilon+c_C \upsilon \quad (29)$$

In the following expression including expressions (28) and (29), $c_A$ is a value obtained by $c_A = c - c_B - c_C$. As a result, even if the components relating to the other taxi companies such as $c_B$ and $c_C$ are not known, as long as the secret key corresponding to $c_A$ of its own company is known, it is possible to configure the ORproof that can make the taxi company to which a taxi belongs secret.

By using the values calculated by the above expressions (28) and (29), a signature is generated from the following expression (30).

$$Sig=(b,u_1,u_2,u_3,c_A,c_B,c_C,\tau_{xA},\tau_{xB},\tau_{xC},\tau_r,\tau'_e,\tau_{\upsilon A},\tau_{\upsilon B},\tau_{\upsilon C}) \quad (30)$$

When the above expression (30) is compared with expression (16) described in the first exemplary embodiment, it is clear that the parameter c used for generation of a signature has been changed to $c_A$, $c_B$, and $c_C$. Likewise, $\tau_x$ has been changed to $\tau_{xA}$, $\tau_{xB}$, and $\tau_{xC}$, and $\tau_\upsilon$ has been changed to $\tau_{\upsilon A}$, $\tau_{\upsilon B}$, and $\tau_{\upsilon C}$.

Verification of a signature according to the second exemplary embodiment is performed by using the following expressions (31) to (33).

$$\overline{b} \leftarrow b^{c2^k_e+r'} e a_0^{-e} a_1^{-\tau_x} a_2^{-\tau_r} \bmod N \quad (31)$$

$$(u_1^{-c} g_1^{\tau_\upsilon}, u_{2A}^{-C_A} g_2^{\tau_{xA}+\tau_{\upsilon A}}, u_{2B}^{-C_B} g_2^{\tau_{xB}+\tau_{\upsilon B}}, u_{2C}^{-C_C} g_2^{\tau_{xC}+\tau_{\upsilon C}}, u_3^{-C} g_3^{\tau_\upsilon+\tau'_e}) \bmod P \quad (32)$$

$$c=H(\underline{gpk_1}, gpk_{2A}, gpk_{2B}, gpk_{2C}, b, u_1, u_2, u_3, \overline{b}, \overline{u_1}, \overline{u_{2A}}, \overline{u_{2B}}, \overline{u_{2C}}, \overline{u_3}, M) \quad (33)$$

According to the second exemplary embodiment, in addition of the verification of the establishment of the above expressions (31) to (33), whether the following expression (34) is established is verified.

$$c=c_A+c_B+c_C \quad (34)$$

In the case of a group signature generated by a taxi 30 that belongs to the taxi company A, the taxi 30 is determined by the following expression (35).

$$h=u_2/u_1^{yA} \quad (35)$$

In expression (35), yA represents the privileged-agent secret key of the taxi company A.

The verification of the group signature generated as described above is performed by using the management-agent public key released by the certificate management server 60 and the privileged-agent public keys released by the taxi companies. For example, a group signature generated by a taxi 30 of the company A can be verified by the management-agent public key $gpk_1$, the privileged-agent public key $gpk_{2A}$ of the company A, the privileged-agent public key $gpk_{2B}$ of the company B, and the privileged-agent public key $gpk_{2C}$ of the company C. As described above, regarding the verification of a group signature according to the second exemplary embodiment, in addition to the management-agent public key, since the privileged-agent public keys released by the privileged agents of all the groups are necessary, the privileged-agent public key corresponding to the target member certificate can be made secret. Namely, from the above group signature, only whether the taxi 30 that has generated the operation management data belongs to a taxi company participating in the taxi association can be determined. In other words, by the verification of the above group signature, the taxi company to which the taxi that has created the signature belongs cannot be known.

In addition, the agent that can determine the taxi 30 that has generated the operation management data is the taxi company alone which has the privileged-agent secret key that forms a pair with the privileged-agent public key used to generate the group signature. Namely, from a group signature generated by a taxi of a taxi company, the taxi company can uniquely determine the taxi that has generated the group signature and the operation management data.

As described above, according to the second exemplary embodiment, a plurality of taxis 30 that belong to a taxi company that participates in the taxi dispatch system are deemed as a single group, and the taxi association, which is an upper organization of the taxi company, issues a member certificate for each of the taxis 30. A group signature generated by using one of the member certificates and the privileged-agent public keys released by all the taxi companies that participate in the taxi dispatch system can be verified by using the management-agent public key released by the taxi association and the above plurality of privileged-agent public keys. In addition, the verification of the group signature only determines whether the entity that has generated the group signature whose validity has been verified by the group signature is eligible to participate in the taxi dispatch system (whether the taxi association authorizes the corresponding agent as a member). In addition, an individual taxi company has the member tracking function of uniquely determining a taxi 30 that has generated a group signature. Specifically, an individual taxi company (operation management server 20) is in charge of generating and managing its privileged-agent public key used when its taxi 30 generates a group signature. As a result, only the taxi company can extract data from a group signature and determine its taxi. As described above, according to the second exemplary embodiment, by appropriately separating the member registration function from the member tracking function based on a group signature, both the verification of the validity of data and the limitation of information to be disclosed are achieved.

The system configurations described in the first and second exemplary embodiments are only examples and not intended to limit the system configuration according to the present invention. For example, if necessary, the system may include a server apparatus that manages revocation of members. While the data management system 40 includes the plurality of management servers 50 in FIG. 2 and these management servers 50 manage operation management data by using so-called blockchain technology, a single server or the like may substantially manage the operation management data in a centralized manner.

In addition, while the first exemplary embodiment assumes that the data management system 40 is a system of an organization independent of the taxi association or the like, the data management system 40 may of course be a system operated under the management of the taxi association.

In addition, while the first and second exemplary embodiments have been described by using a group signature scheme (the Camenisch-Groth scheme) described in Non-Patent Literatures 1 and 2 as an example, another group signature scheme may of course be used. In particular, regarding to the second exemplary embodiment, since the ORproof indicating "a correct group signature corresponding to one of the privileged-agent public keys" is configured by dividing a challenge in an existing group signature scheme, it is apparent that the configuration can be realized based on another group signature scheme different from the scheme (the Camenisch-Groth scheme) described in Non-Patent Literatures 1 and 2.

The above exemplary embodiments can partially or entirely be described, but not limited to, as follows.

[Mode 1]
See the system according to the above first aspect.
[Mode 2]
Preferably, the system according to mode 1;
wherein an individual one of the plurality of nodes belongs to one of a plurality of groups;
wherein the system further comprises a plurality of node management servers, an individual one of which manages a node(s) that belongs to a corresponding one of the plurality of groups; and
wherein an individual one of the node management servers issues a member certificate(s) to a node(s) that belongs to its own group, the member certificate(s) being used when the node(s) generates a group signature(s).
[Mode 3]
Preferably, the system according to mode 1;
wherein an individual one of the plurality of nodes belongs to one of a plurality of groups; and
wherein the system further comprises:
a plurality of node management servers, an individual one of which manages a node(s) that belongs to a corresponding one of the plurality of groups;
a certificate management server that issues a member certificate to an individual one of the plurality of nodes, the member certificate being used when the individual one of the plurality of nodes generates a group signature;
wherein an individual one of the plurality of node management servers releases a privileged-agent public key; and
wherein the certificate management server releases a management-agent public key.
[Mode 4]
Preferably, the system according to mode 3; wherein an individual one of the nodes generates a group signature by using the management-agent public key and the privileged-agent public keys released by the respective node management servers.
[Mode 5]
Preferably, the system according to mode 4; wherein the generated group signature is verifiable by using the management-agent public key released by the certificate management server and the privileged-agent public keys released by the respective node management servers.
[Mode 6]
Preferably, the system according to any one of modes 3 to 5; wherein an individual one of the node management servers extracts data included in a group signature generated by a node that belongs to the group that this node management server manages by using a privileged-agent secret key that forms a pair with its own privileged-agent public key and determines the node that belongs to the group that the node management server itself manages.
[Mode 7]
See the system according to the above second aspect.
[Mode 8]
Preferably, the system according to mode 7; wherein a group signature generated by any one of the nodes includes data which proves that a public key of this node that has generated the group signature by encrypting using any one of the privileged-agent public keys released by the respective node management servers, that a member certificate exists for the public key of the node, and that an entity that has encrypted the public key has a secret key corresponding to the public key of the node.
[Mode 9]
Preferably, the system according to mode 7 or 8; wherein an individual one of the privileged-agent public keys released by the respective node management servers is a public key generated in such a manner that a partial element(s) is common among the public keys.
[Mode 10]
Preferably, the system according to mode 9; wherein the partial element(s) that is common among the public keys is an element generated dependently on a privileged-agent secret key that forms a pair with the corresponding privileged-agent public key.
[Mode 11]
Preferably, the system according to mode 10; wherein a public key of an individual one of the nodes is generated based on the partial element(s) common among the public keys.
[Mode 12]
Preferably, the system according to any one of modes 7 to 11; wherein an individual one of the nodes randomly selects a challenge value(s) of a group(s) different from its own group and generates the group signature by using the randomly selected challenge value(s).
[Mode 13]
Preferably, the system according to mode 12; wherein verification of a group signature generated by any one of the nodes includes at least verification using the calculated hash value(s), the randomly selected challenge value(s), and the challenge value of the group to which the node that has generated the group signature belongs.
[Mode 14]
See the data management method according to the above third aspect.
[Mode 15]
See the program according to the above fourth aspect.
Modes 14 and 15 can be expanded in the same way as mode 1 is expanded to modes 2 to 6.

The disclosure of each of the above Patent Literatures and the like referred to is incorporated herein by reference thereto. Variations and adjustments of the exemplary embodiments and the examples are possible within the scope of the disclosure (including the claims) of the present invention and based on the basic technical concept of the present invention. Various combinations and selections of various disclosed elements (including the elements in the claims, exemplary embodiments, examples, drawings, etc.) are possible within the scope of the disclosure of the present invention. Namely, the present invention of course includes various variations and modifications that could be made by those skilled in the art according to the overall disclosure including the claims and the technical concept. The description discloses numerical value ranges. However, even if the description does not particularly disclose arbitrary numerical values or small ranges included in the ranges, these values and ranges should be deemed to have been specifically disclosed.

REFERENCE SIGNS LIST

10 dispatch server
11 CPU (Central Processing Unit)
12 memory
13 input-output interface
14 NIC (Network Interface Card)
20, 20-1 to 20-α operation management server 30, 30-1 to 30-β taxi
31 taximeter
32 smartphone
40 data management system
50, 50-1 to 50-4, 102 management server
60 certificate management server
101 node
201, 301, 401, 501, 601 communication control part
202, 302, 402, 502, 602 storage part
203 dispatch processing part
211 signature verification part
212 dispatched-vehicle determination part
303, 603 certificate management part
311, 311a, 611 key generation part
312, 612 certificate generation part
403 certificate acquisition part
404 operation management data processing part
411 operation management data generation part
412 group signature generation part
421 ring group signature generation part
503 ledger management part
511 block generation part
512 block verification part

What is claimed is:

1. A system, comprising:
    a plurality of nodes, an individual one of which belongs to a group;
    a plurality of node management servers, an individual one of which manages a node(s) that belongs to a corresponding one of the groups; and
    a certificate management server that issues a member certificate to an individual one of the plurality of nodes, the member certificate being used when the individual one of the plurality of nodes generates a group signature, and releases a management-agent public key;
    wherein an individual one of the plurality of node management servers releases a privileged-agent public key;
    wherein an individual one of the nodes generates a group signature to be attached to data, by using at least the management-agent public key and the privileged-agent public keys released by the respective node management servers; and
    wherein an individual one of the nodes randomly selects a challenge value(s) of a group(s) different from its own group and generates the group signature by using the randomly selected challenge value(s).

2. The system according to claim 1, wherein verification of a group signature generated by any one of the nodes includes at least verification using the calculated hash value(s), the randomly selected challenge value(s), and the challenge value of the group to which the node that has generated the group signature belongs.

3. A non-transitory computer-readable recording medium storing a program, executed by a computer(s) mounted on:
    a plurality of nodes, an individual one of which belongs to a group;
    a plurality of node management servers, an individual one of which manages a node(s) that belongs to a corresponding one of the groups; and
    a certificate management server that issues a member certificate to an individual one of the plurality of nodes, the member certificate being used when the individual one of the plurality of nodes generates a group signature, and releases a management-agent public key,
    the program causing the computer(s) to perform processing for:
    releasing a privileged-agent public key;
    generating a group signature to be attached to data, by using at least the management-agent public key and the privileged-agent public keys released by the respective node management servers;
    selecting a challenge value(s) of a group(s) different from its own group; and
    generating the group signature by using the randomly selected challenge value(s).

* * * * *